May 8, 1962 S. CLAUSEN ETAL 3,033,210
TOSCANI CIGAR MACHINE
Filed May 24, 1956 19 Sheets-Sheet 1

INVENTORS
SIGURD CLAUSEN
JOSEPH A. NEUMAIR
BY VICTOR G. HANSON

Bradley Cohn
ATTORNEY

May 8, 1962 S. CLAUSEN ETAL 3,033,210
TOSCANI CIGAR MACHINE
Filed May 24, 1956 19 Sheets-Sheet 2
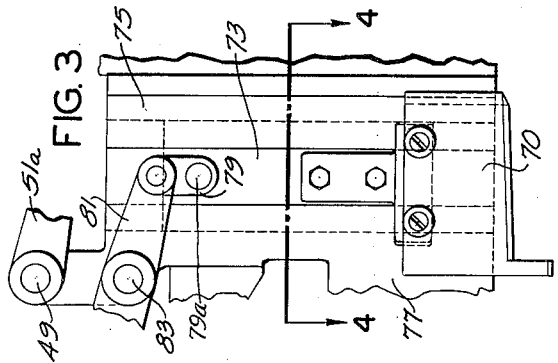
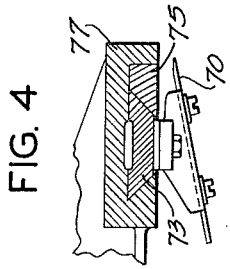
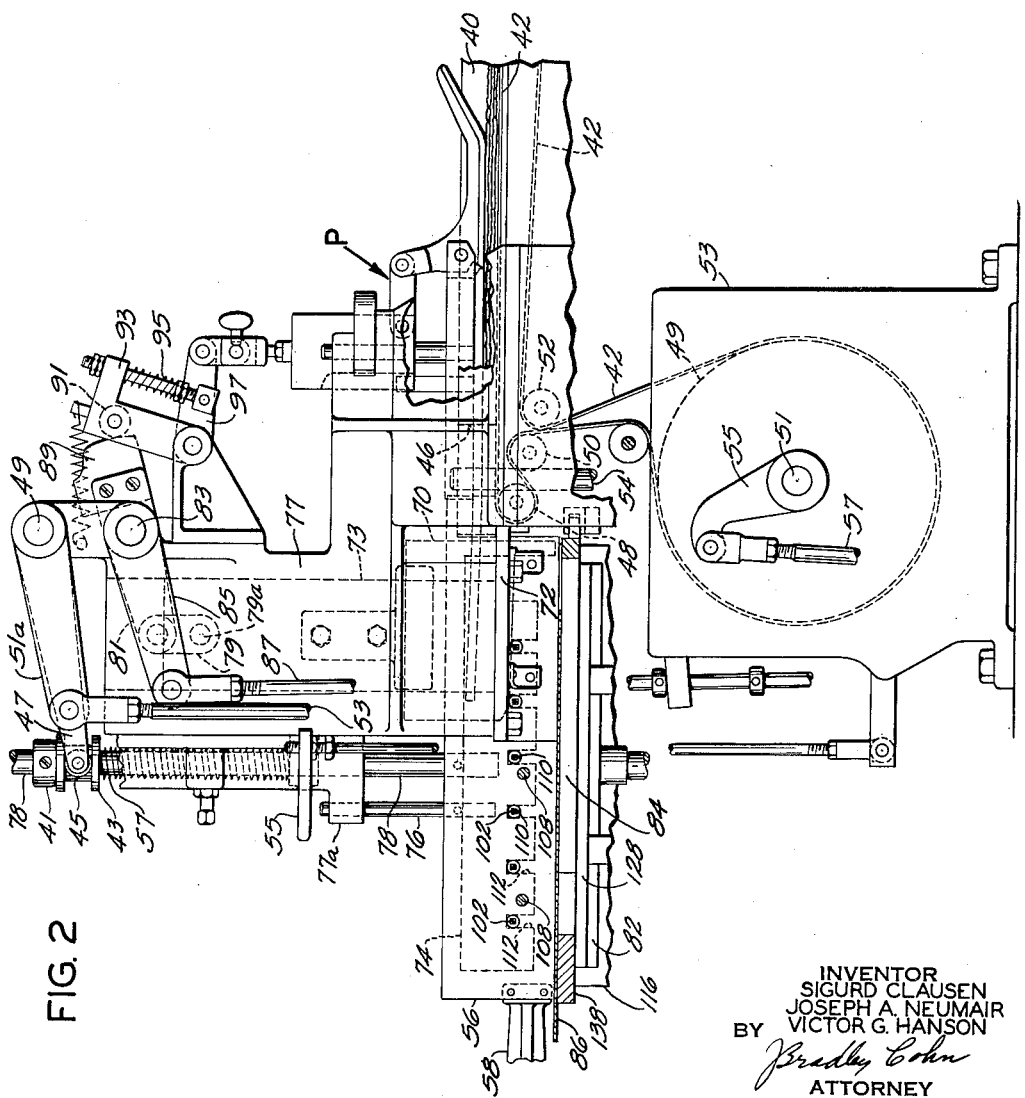
INVENTOR
SIGURD CLAUSEN
JOSEPH A. NEUMAIR
BY VICTOR G. HANSON
Bradley Cohn
ATTORNEY

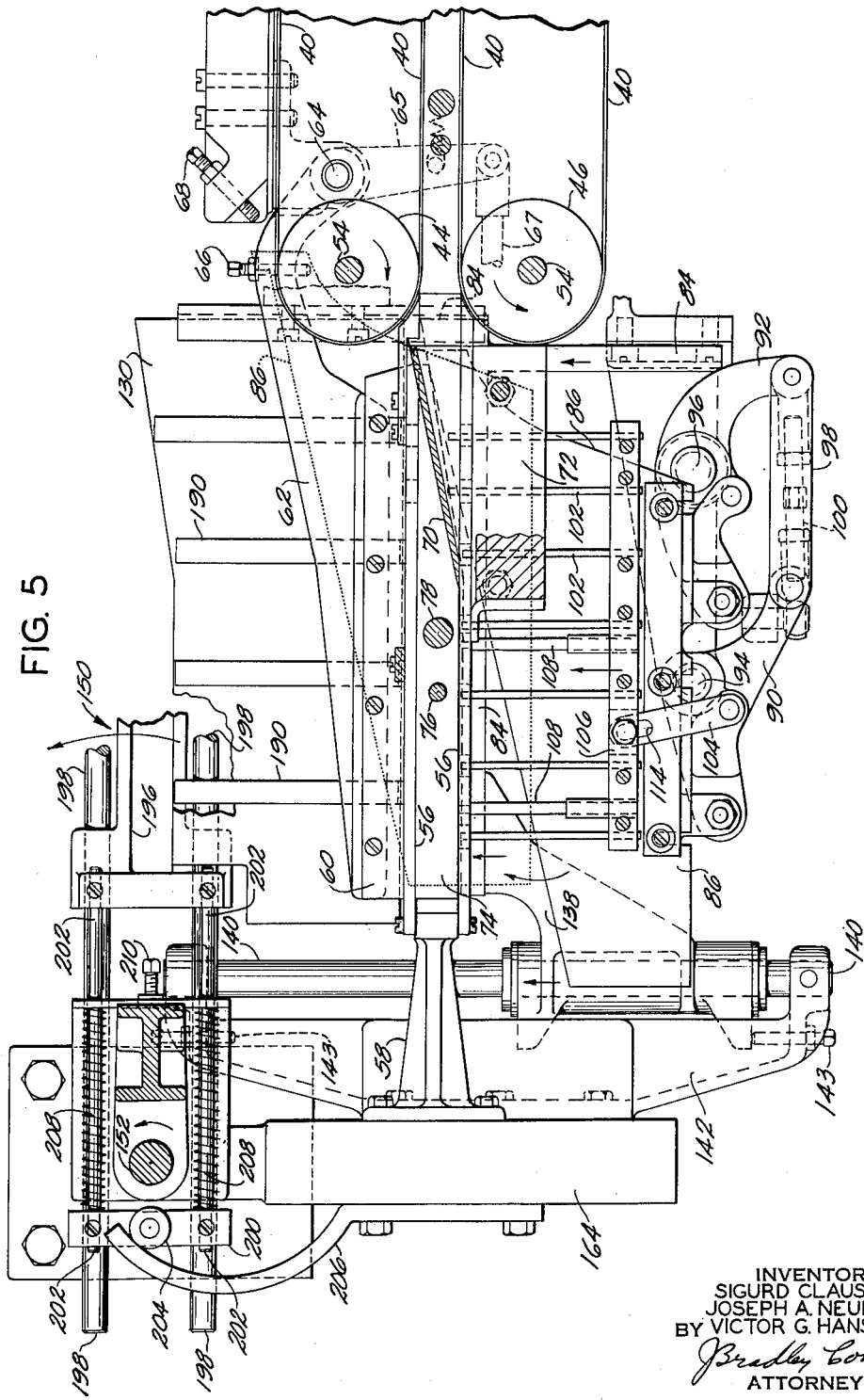

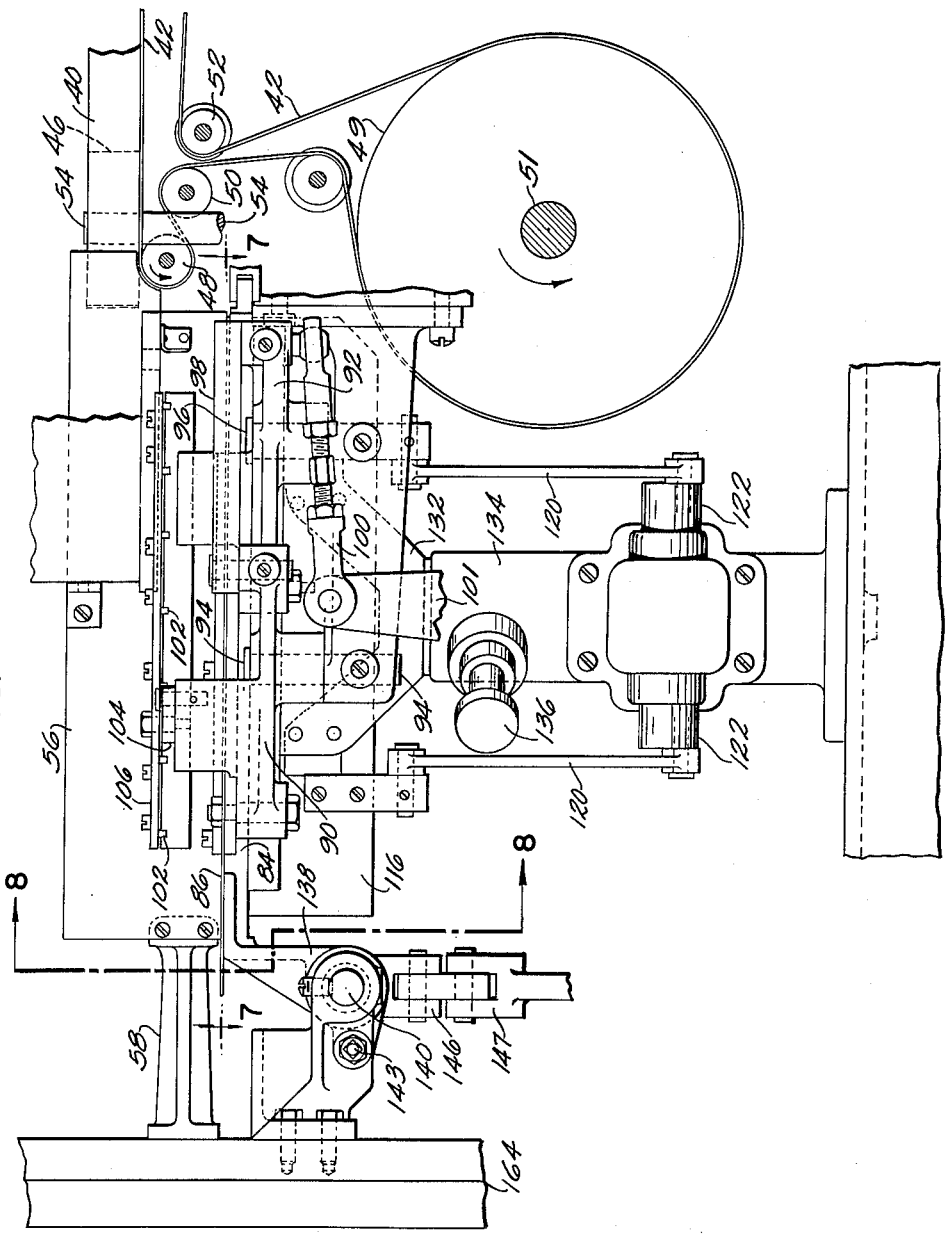

May 8, 1962 S. CLAUSEN ETAL 3,033,210
TOSCANI CIGAR MACHINE
Filed May 24, 1956 19 Sheets-Sheet 5

INVENTORS
SIGURD CLAUSEN
JOSEPH A. NEUMAIR
BY VICTOR G. HANSON
Bradley Cohn
ATTORNEY

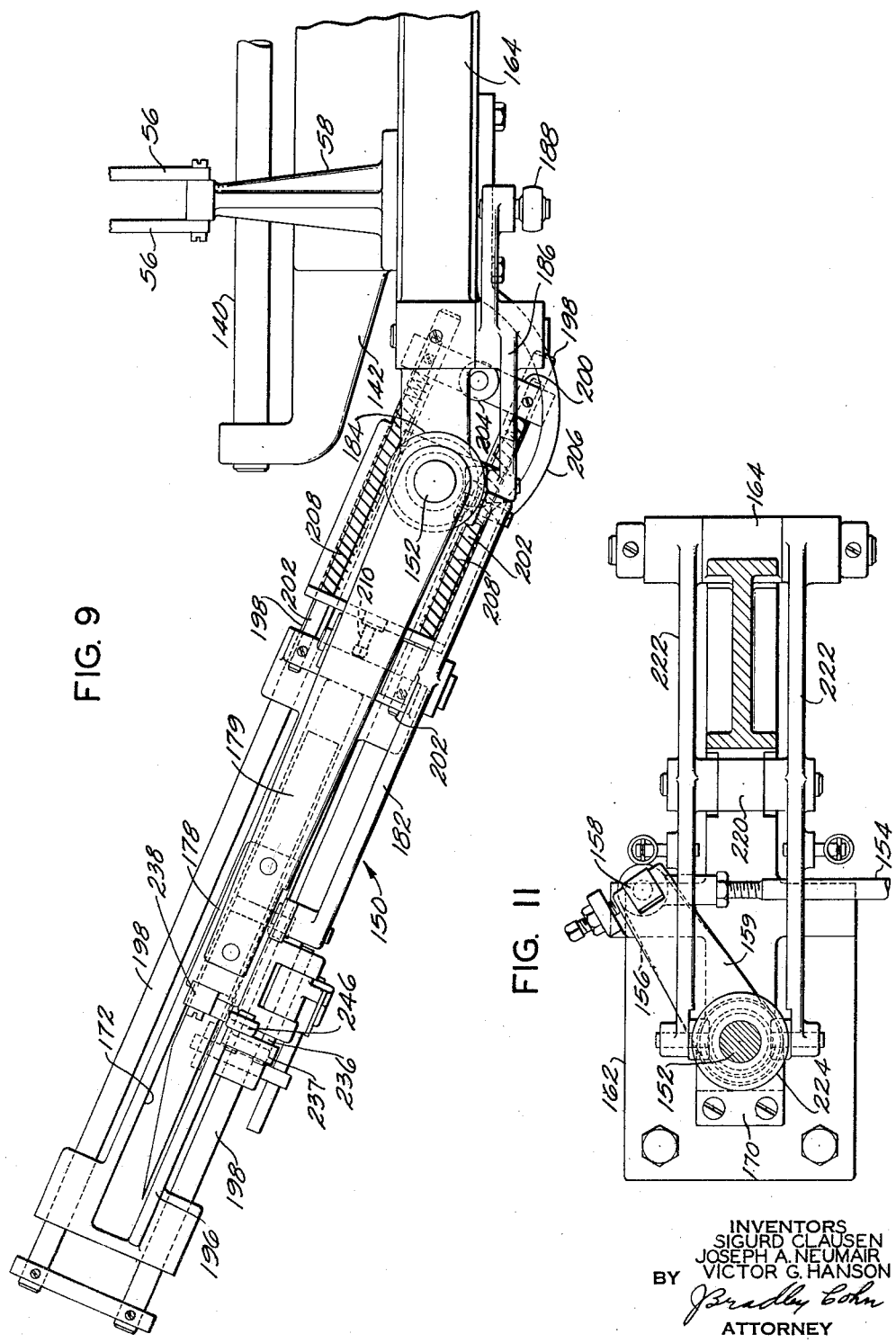

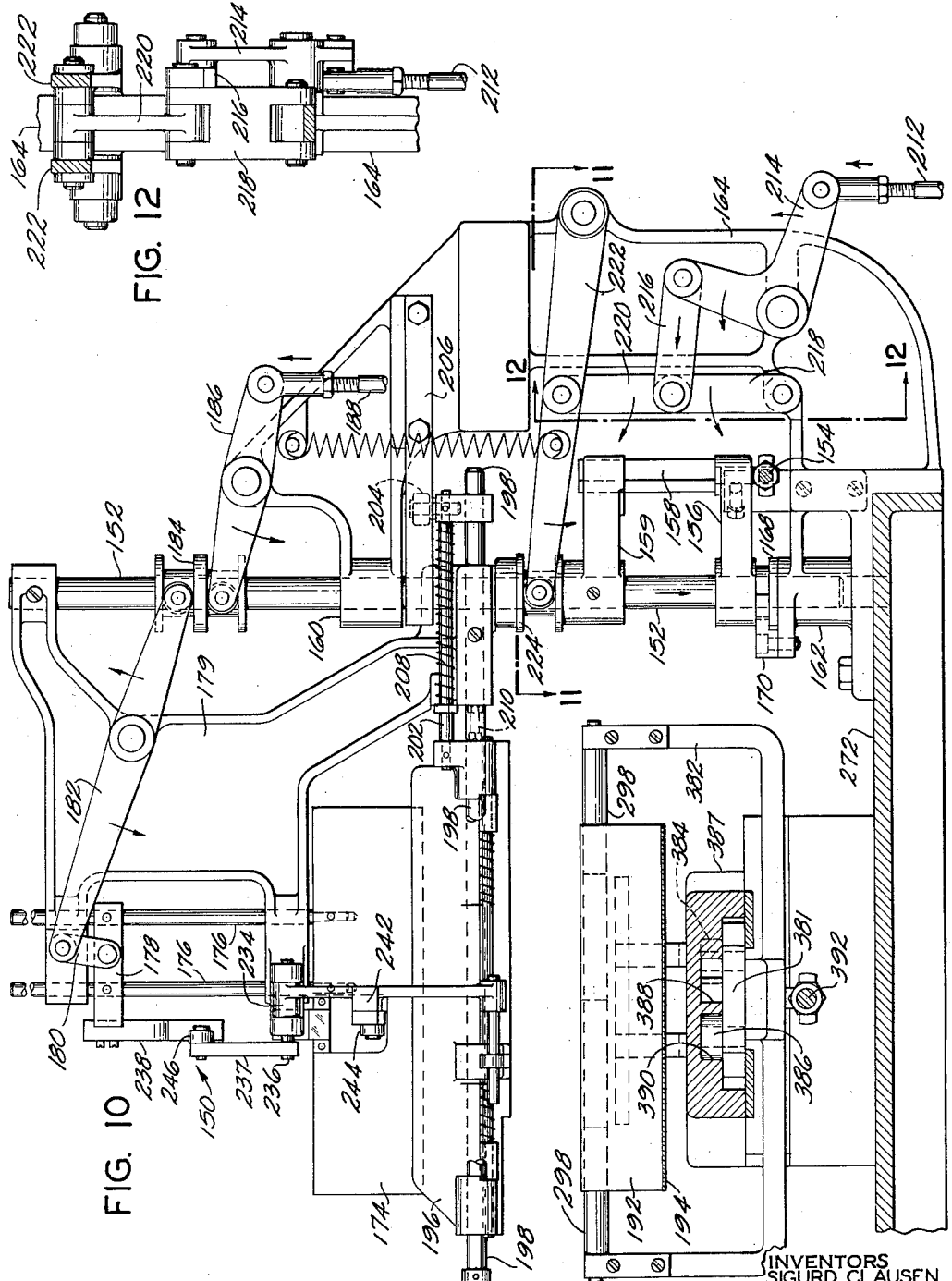

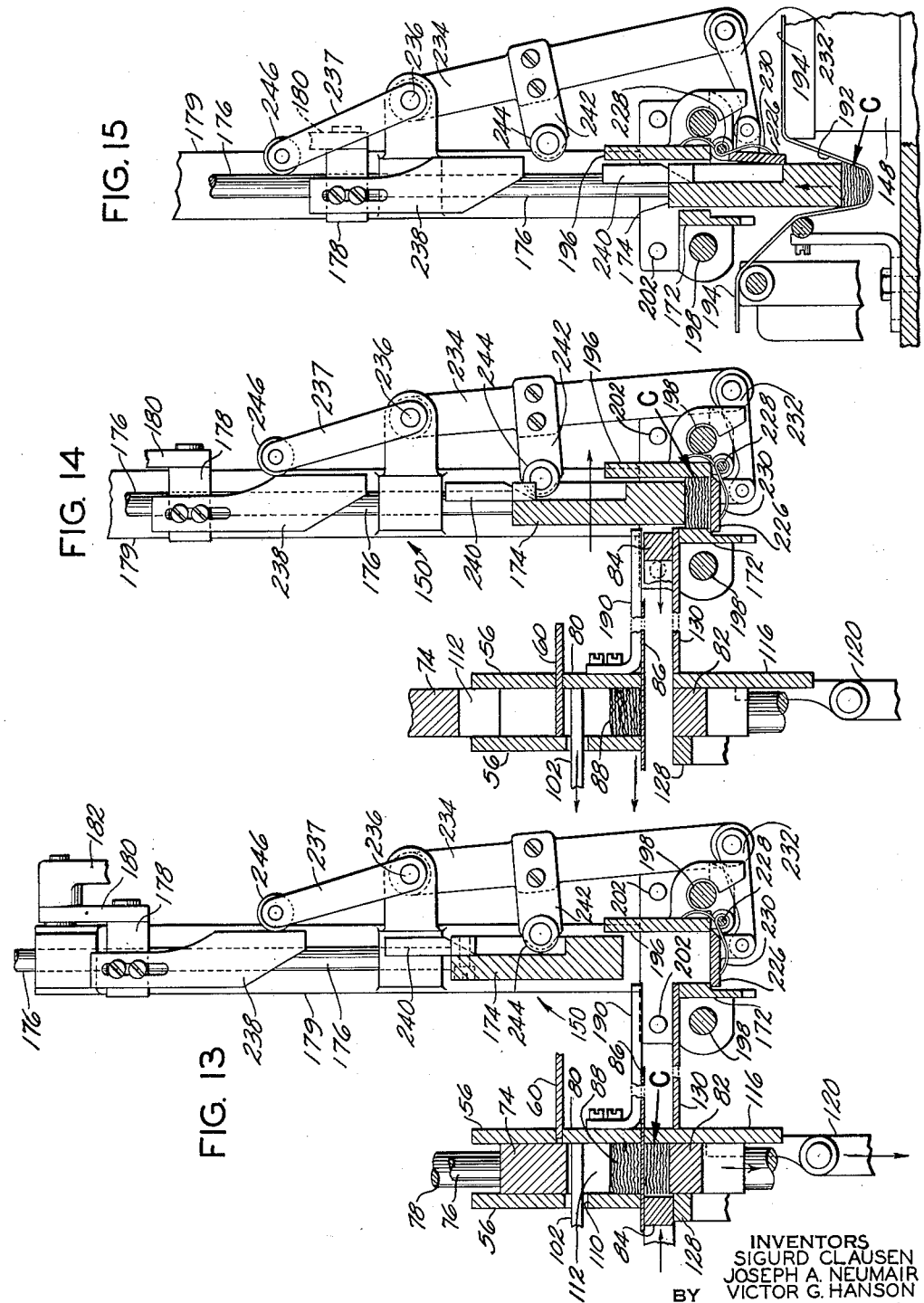

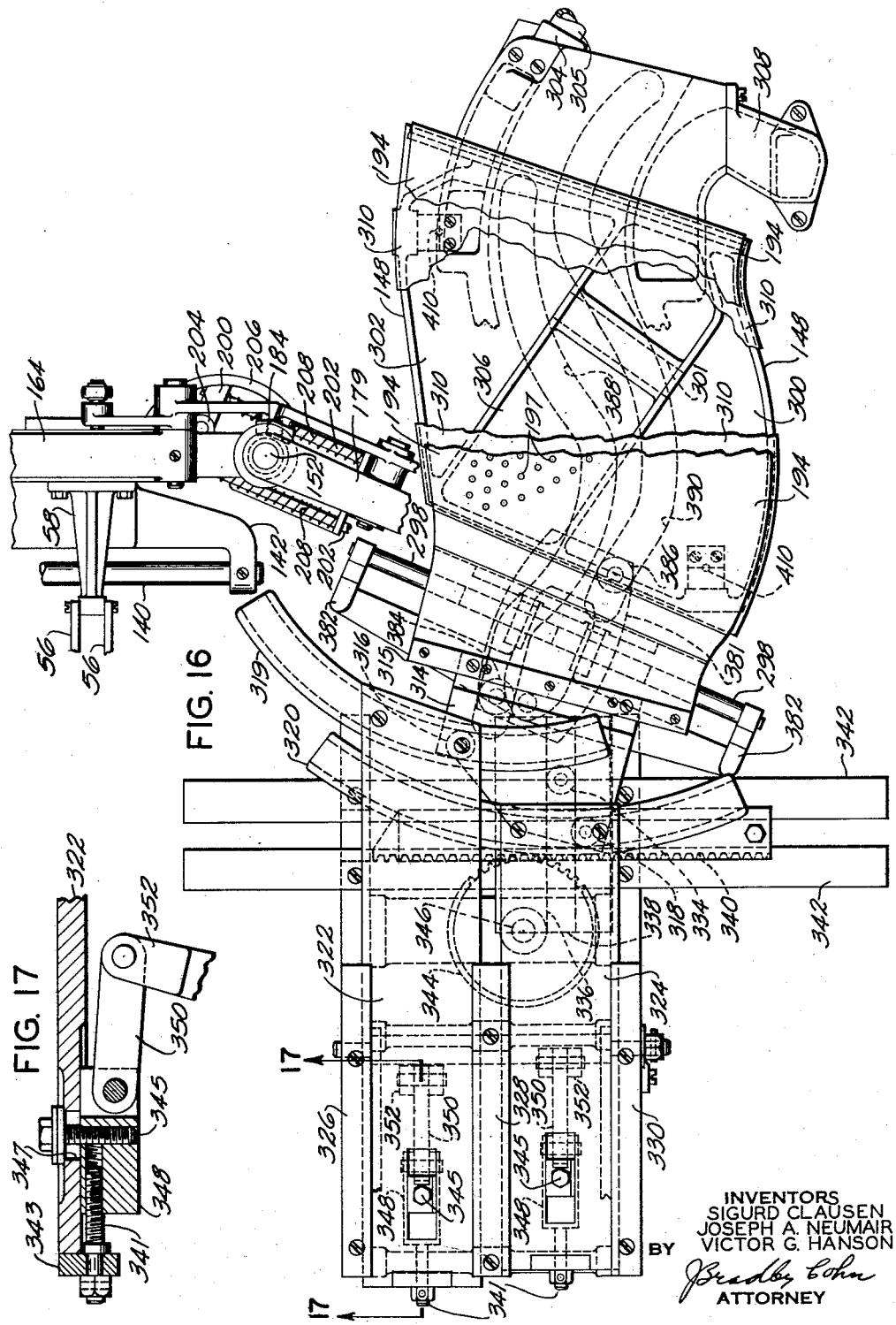

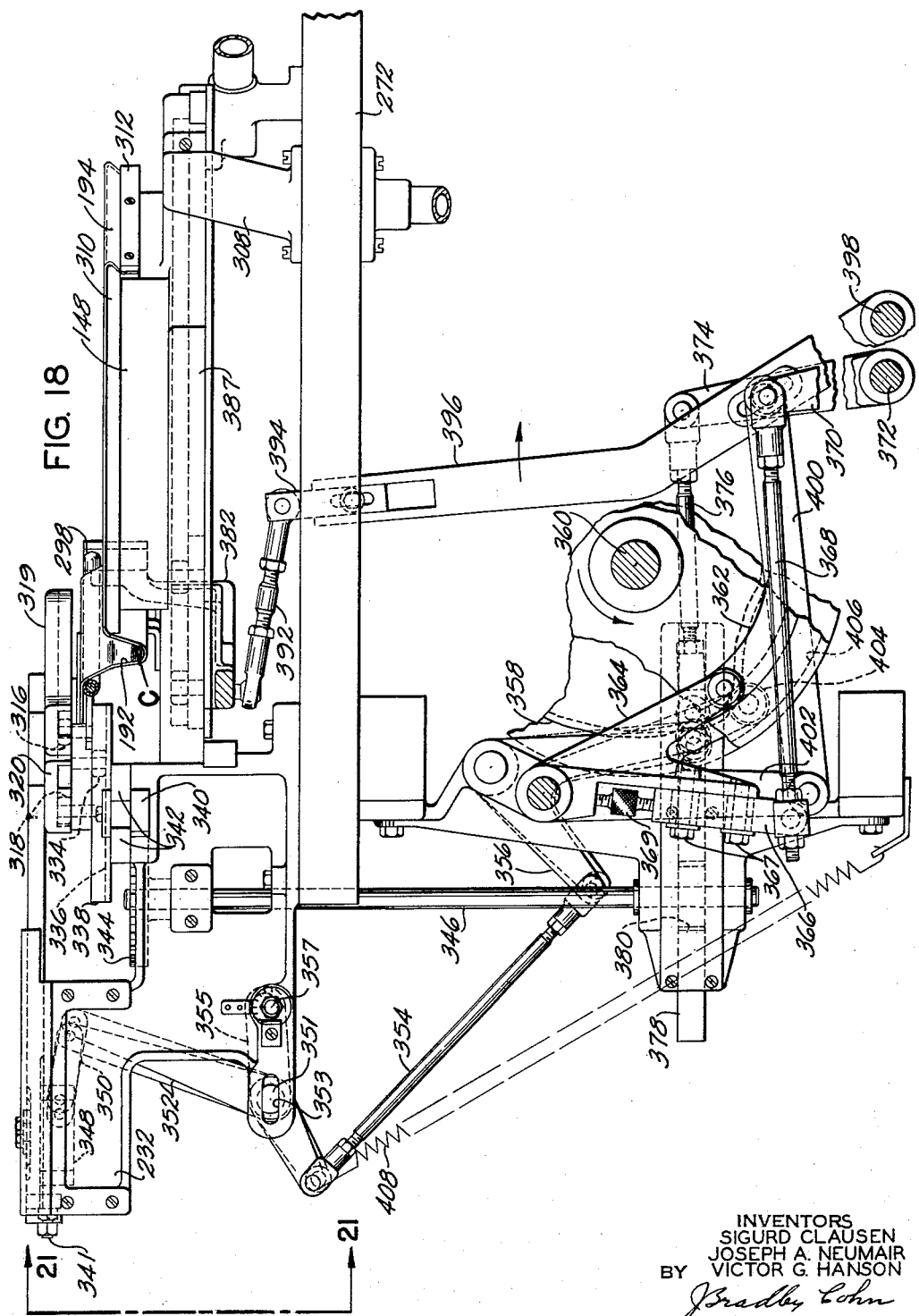

May 8, 1962 S. CLAUSEN ETAL 3,033,210
TOSCANI CIGAR MACHINE
Filed May 24, 1956 19 Sheets-Sheet 11
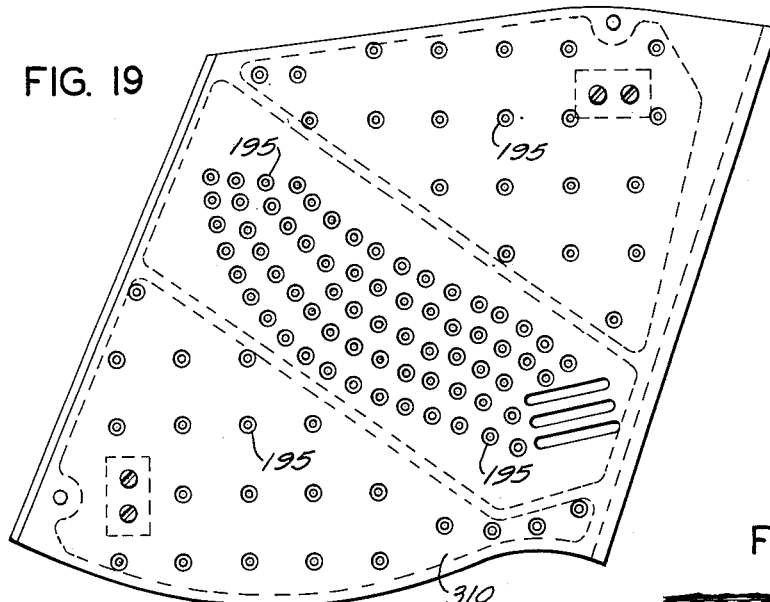
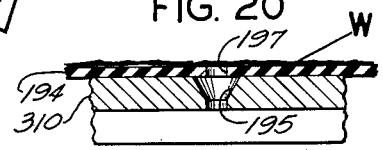
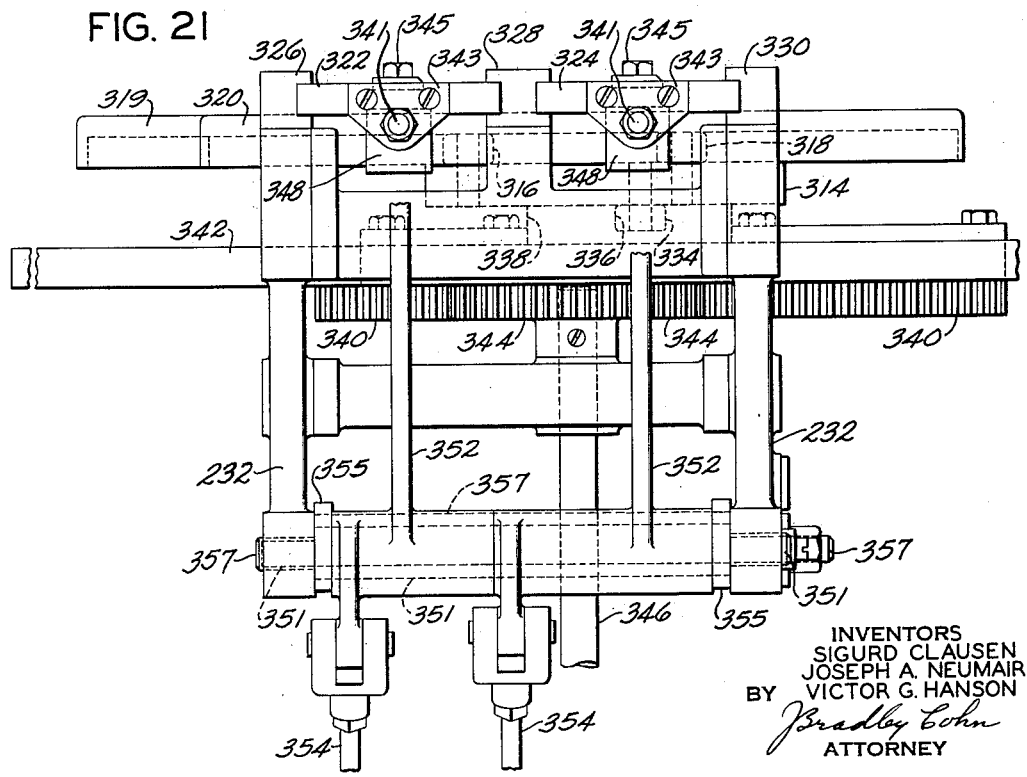
INVENTORS
SIGURD CLAUSEN
JOSEPH A. NEUMAIR
VICTOR G. HANSON
BY Bradley Cohn
ATTORNEY

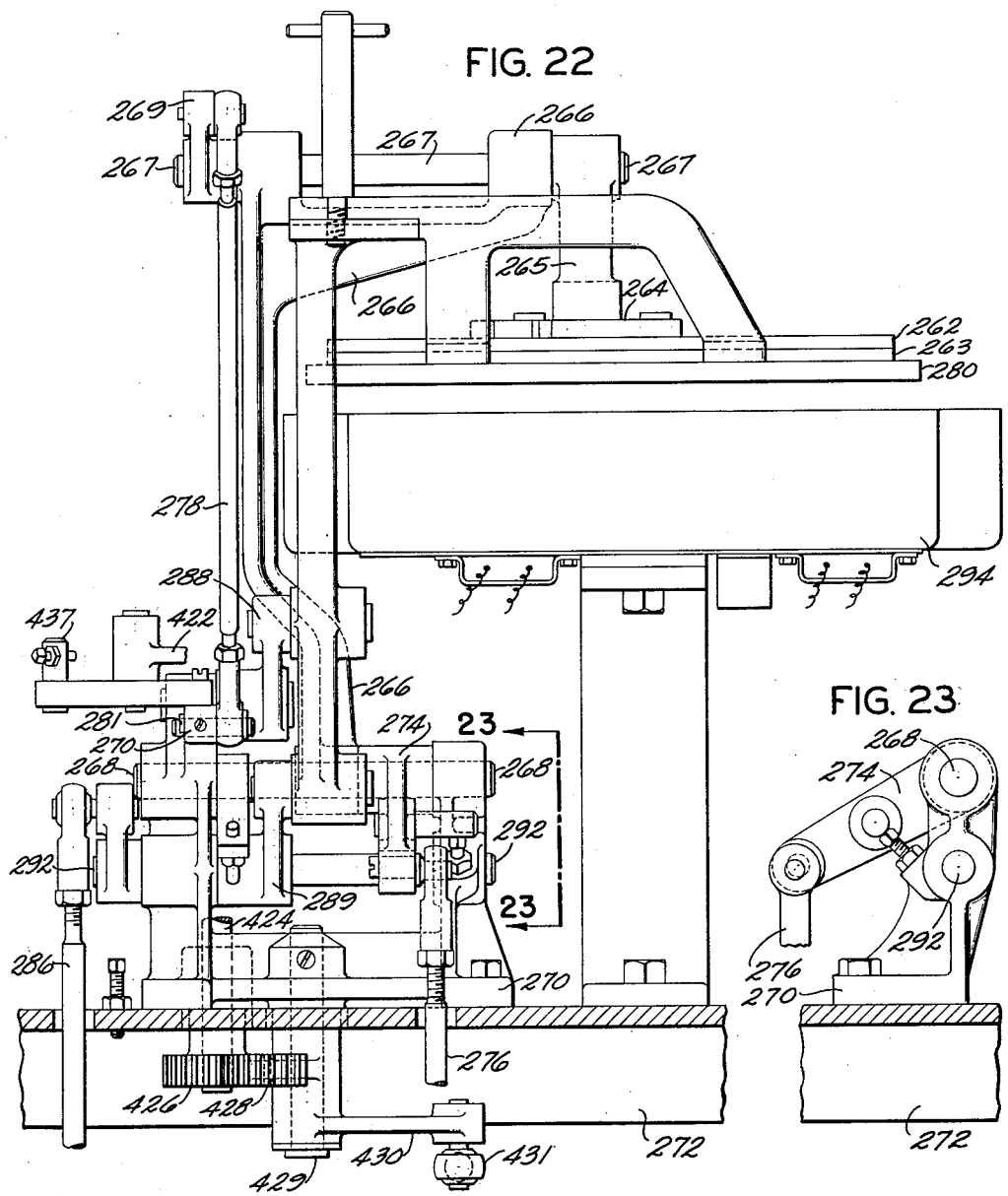

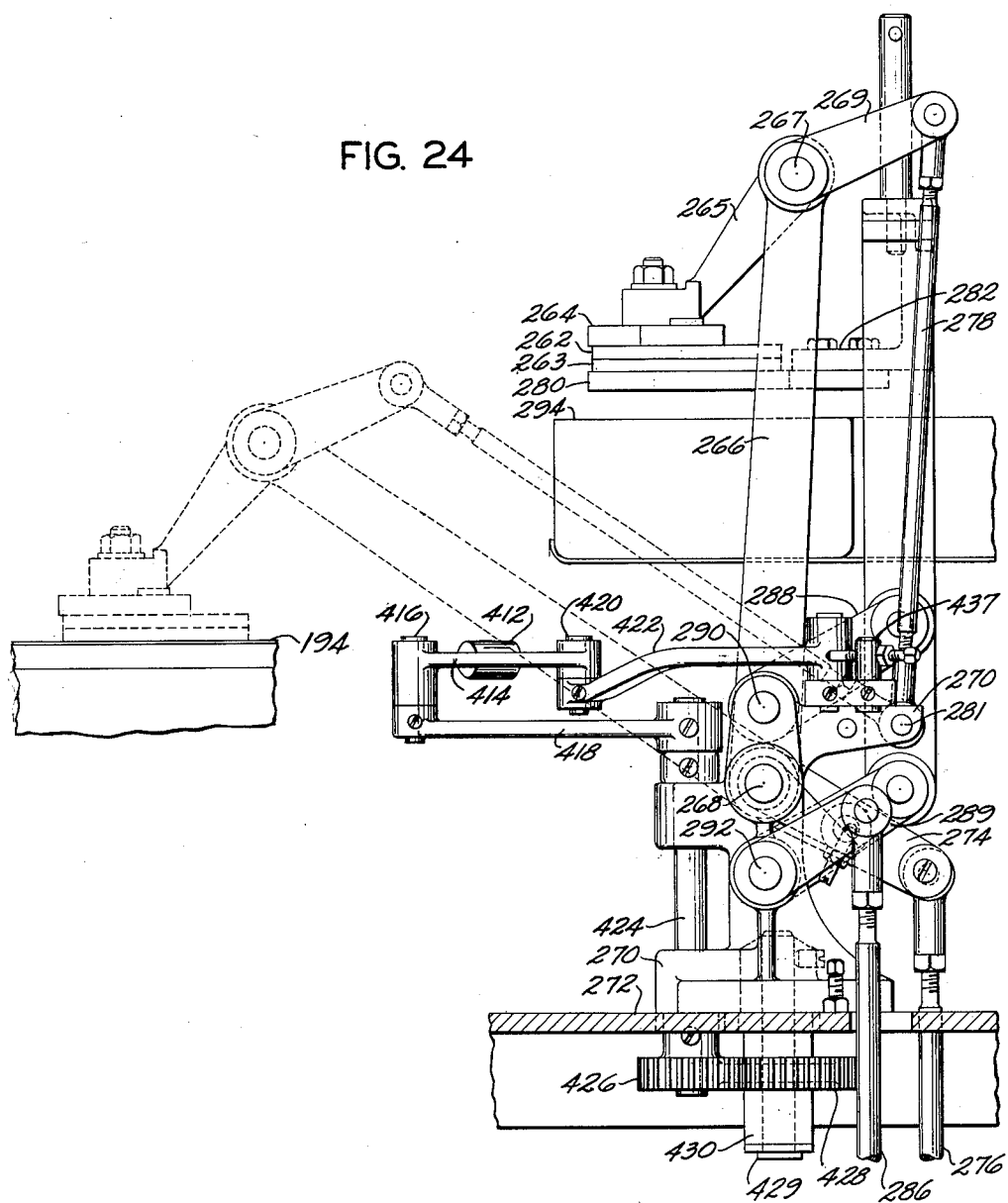

May 8, 1962

S. CLAUSEN ETAL 3,033,210

TOSCANI CIGAR MACHINE

Filed May 24, 1956

INVENTORS
SIGURD CLAUSEN
JOSEPH A. NEUMAIR
VICTOR G. HANSON
BY
*J Bradley Cohn*
ATTORNEY

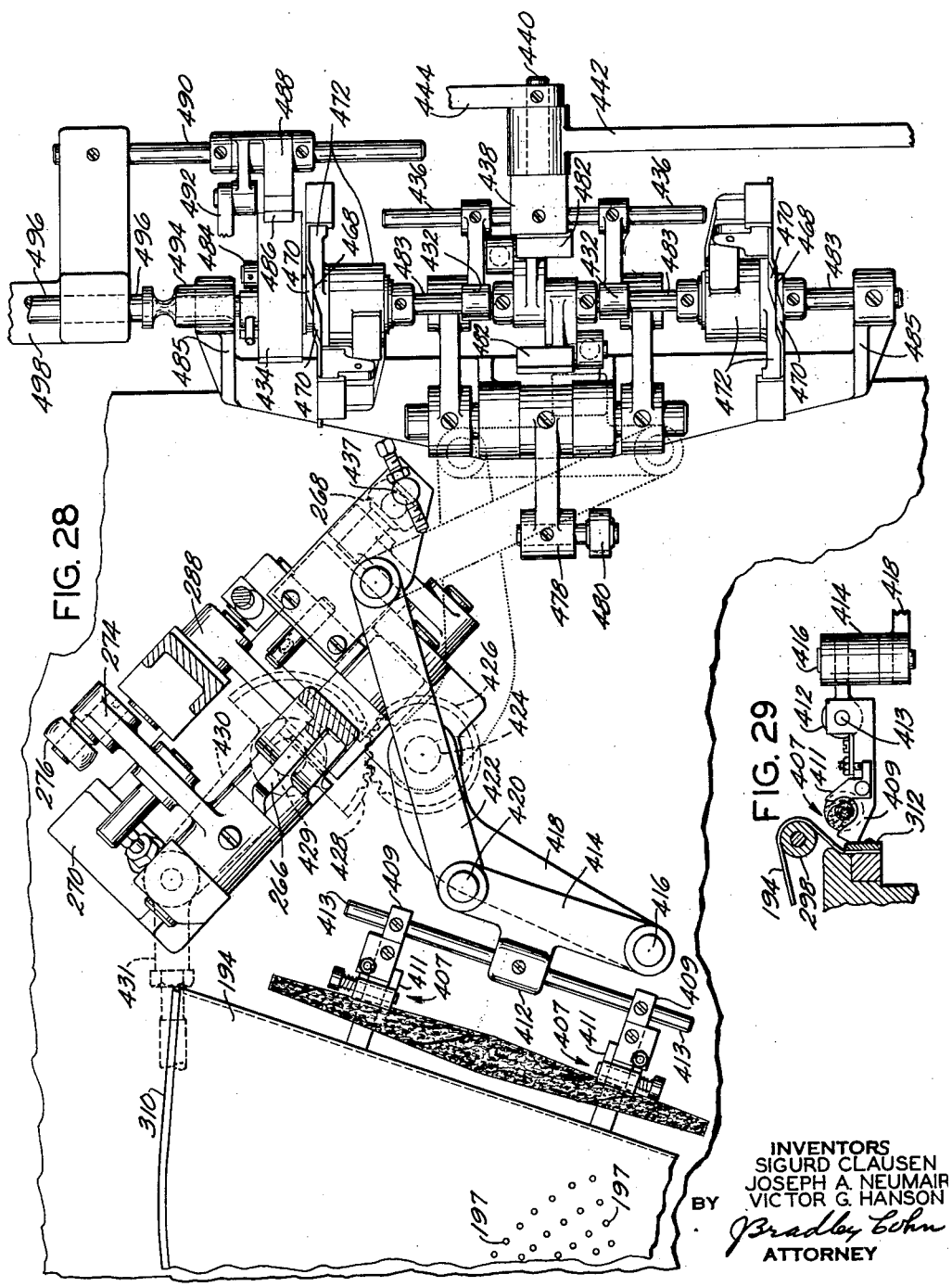

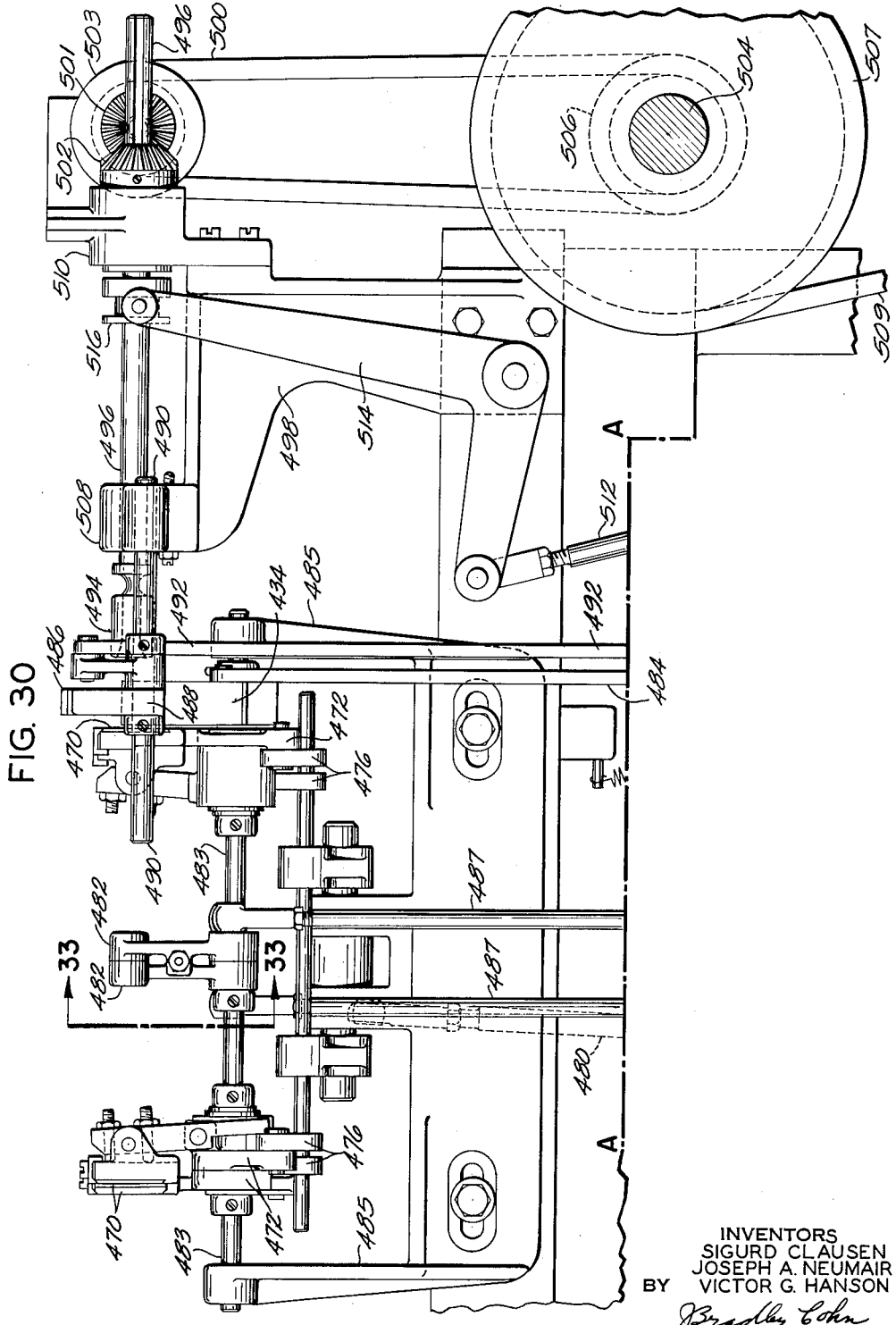

May 8, 1962 S. CLAUSEN ETAL 3,033,210
TOSCANI CIGAR MACHINE
Filed May 24, 1956 19 Sheets-Sheet 17
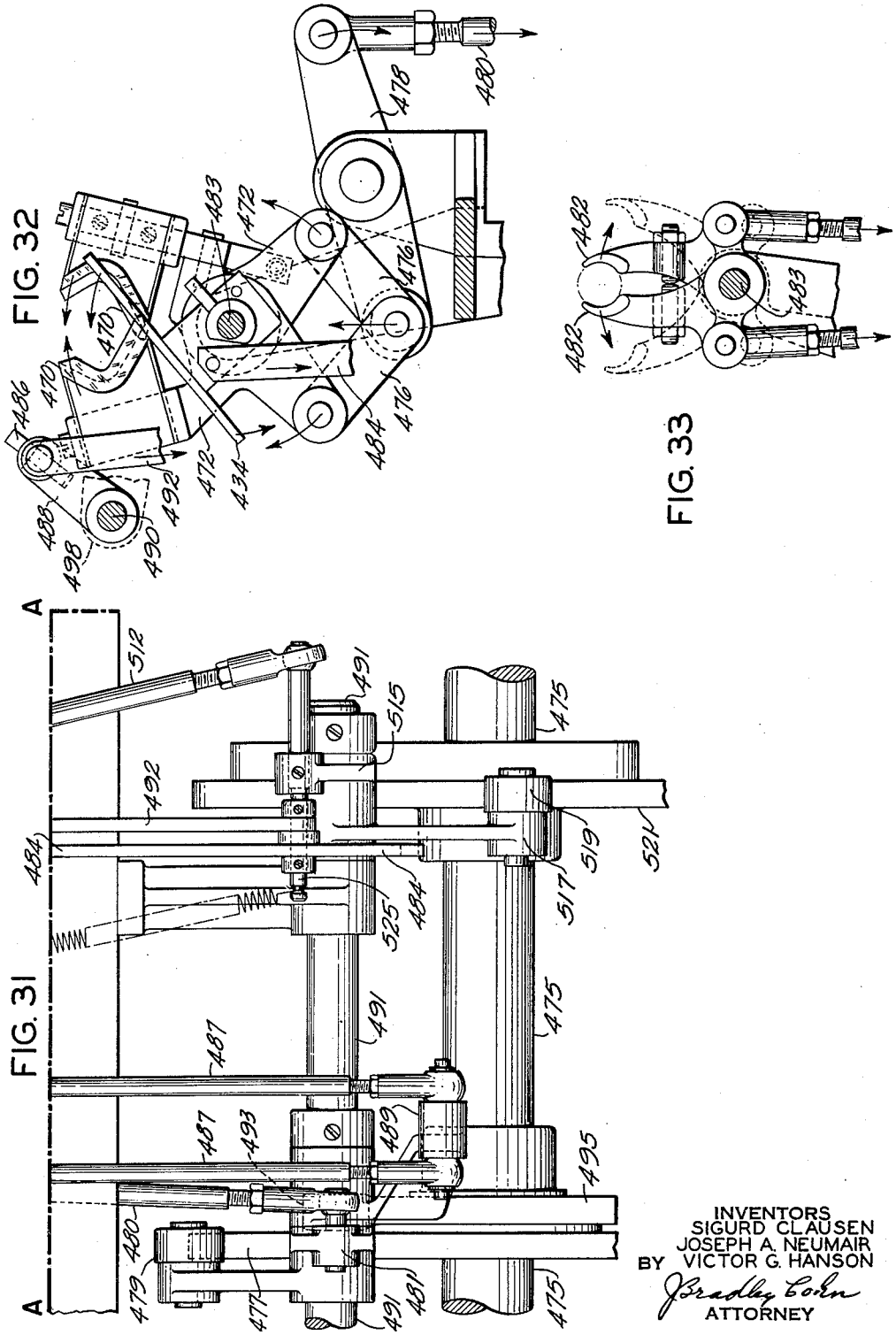
INVENTORS
SIGURD CLAUSEN
JOSEPH A. NEUMAIR
BY VICTOR G. HANSON
Bradley Cohn
ATTORNEY May 8, 1962 S. CLAUSEN ETAL 3,033,210
TOSCANI CIGAR MACHINE
Filed May 24, 1956 19 Sheets-Sheet 19

INVENTORS
SIGURD CLAUSEN
JOSEPH A. NEUMAIR
BY VICTOR G. HANSON
Bradley Cohn
ATTORNEY

United States Patent Office 3,033,210
Patented May 8, 1962

3,033,210
TOSCANI CIGAR MACHINE
Sigurd Clausen, Brooklyn, Joseph A. Neumair, Hollis, and Victor George Hanson, Brooklyn, N.Y., assignors to International Cigar Machinery Company, a corporation of New Jersey
Filed May 24, 1956, Ser. No. 587,168
16 Claims. (Cl. 131—29)

This invention relates to a machine for making Toscani cigars.

In Toscani cigar machines previously known in the art a number of defects have been present which have seriously interfered with correct forming of the product, rapidity of production and continuous operation without shut-down for cleaning and servicing. These defects of previously known machines generally fall into the following categories:

(1) Imperfect cutting off of the charge of tobacco to form the required doubly tapered form as it is fed into the machine.

(2) Lack of positiveness in measuring the charge to be contained in each cigar.

(3) Lack of means for centering the charge to insure accurate forming of cigars of different lengths.

(4) Jamming of the transfer mechanism by adhering shreds of tobacco.

(5) Unsatisfactory control of tautness and position of the apron during the rolling of the cigar.

(6) Faulty motion and operation of the rolling pin.

(7) Fouling of the mechanism due to inexact application of paste to the wrapper and the spreading of excess paste where not needed.

(8) Insufficient hold of apron and wrapper due to defective suction holding mechanism.

One object of the present invention is to provide a machine containing novel features which substantially avoid the above-listed deficiencies of previously known Toscani cigar machines and thereby to produce a machine capable of continuous operation at a high rate of production with a resulting decrease in cost per piece while at the same time greatly improving the quality and uniformity of the product.

Other objects of the invention and advantages to be derived therefrom will become apparent from the detailed description and from the accompanying drawings.

In general the novel features of the present invention which contribute to the attainment of the objects described by overcoming the defects of previously known machines may be summarized as follows:

(1) The apron loading mechanism is offset from the charge cutting and measuring mechanism to permit more complete and accurate functioning of both.

(2) Provisions for compacting the entering filler into a measuring chamber where the precise thickness of charge required is cut off by a knife having partially rotary slicing motion which has been found to produce a cleaner and easier cut than the simple linear motion hitherto known and is particularly essential with the heavy high moisture content tobacco used in Toscani cigars.

(3) Means for transferring the charge from the measuring chamber to the apron charging station.

(4) Positive forcing of the charge from the transfer mechanism into a pocket formed in the apron, including novel means for centering the charge to accommodate charges of various lengths.

(5) Positive closing mechanism for the trap door which opens to accommodate the transfer to the apron pocket, the sticking of the trap door partially open by adherent shreds of heavy moist tobacco used in Toscani cigars being thus prevented.

(6) Refinement of the motions of the apron during rolling of the cigar by means of cam and lever combinations to include properly timed and combined transverse and longitudinal motions of the apron head to provide correct tightness of the apron as a whole and of both its edges independently, as well as adjustment of the apron as a whole or of either of its edges independently.

(7) Improved means of applying paste to the wrapper by the use of a paste applying pad formed to match the outline of the wrapper, spilling of excess paste on the apron being thus avoided while at the same time providing adequate paste deposition.

(8) A novel method of withdrawing the requisite amount of paste from the paste pot and applying it uniformly to the applicator which transfers it to the wrapper.

(9) An improved arrangement of suction holes in the rolling table and apron whereby both the apron and the wrapper are held in place with the proper force distribution.

(10) An improved arrangement for trimming the final cigar and then knurling the head end of the cigar.

(11) Means to clean the trimmer knives at the head end to prevent fouling of the knurler.

The invention may be understood from the following description, when read with reference to the following drawings, which, taken together, disclose a preferred embodiment in which the invention is presently incorporated. It is to be understood, however, that the invention may be incorporated in other embodiments which may be suggested to those skilled in the art by the present disclosure.

In the drawings:

FIG. 2 is a sectional side elevation of the tobacco filler feed and the vertical charge cutting mechanism;

FIG. 3 is a partial side elevation of the vertical charge cutting knife and its guiding and actuating mechanism;

FIG. 4 is a sectional plan view of the vertical charge cutting knife taken on line 4—4 of FIG. 3;

FIG. 5 is a plan view, partly in section, illustrating the vertical and horizontal charge cutting mechanisms and the horizontal charge transfer;

FIG. 6 is a side elevation of the charge measuring and horizontal cutting and transfer mechanism;

FIG. 9 is a plan view of the horizontal swing transfer which carries the charge to the bunch rolling table;

FIG. 10 is a side elevation of the horizontal swing transfer shown in conjunction with the bunch rolling apron;

FIG. 11 is a partial sectional plan view of the horizontal swing transfer actuating mechanism, taken on line 11—11 of FIG. 10;

FIG. 12 is a sectional end elevation of the same, taken on line 12—12 of FIG. 10;

FIG. 13 is a sectional end elevation illustrating the horizontal charge cutting action in the measuring chamber;

FIG. 14 is also a sectional end elevation illustrating the removal of the cut charge from the measuring chamber and its delivery by the horizontal charge transfer to the pocket of the horizontal swing transfer;

FIG. 15 is a sectional end elevation illustrating the ejecting of the charge from the swing transfer pocket into the pocket or loop of the bunch rolling apron;

FIG. 16 is a plan view of the bunch rolling table in conjunction with the bunch rolling apron and its actuating control mechanism, the rolling pin and a portion of the horizontal swing transfer.

FIG. 17 is a partial sectional side elevation showing the apron control adjusting device, taken on line 17—17 of FIG. 16;

FIG. 18 is a side elevation, partly in section, of the bunch rolling table and the apron and rolling pin actuating mechanisms;

FIG. 19 is a plan view of the removable rolling table top plate illustrating the suction hole arrangement;

FIG. 20 is a fragmentary sectional side elevation of the same showing one of the suction holes in conjunction with one of the holes in the rolling apron;

FIG. 21 is an end elevation of the rolling apron control and actuating mechanism, taken on line 21—21 of FIG. 18;

FIG. 22 is a side elevation of the wrapper paste applying mechanism;

FIG. 23 is a fragmentary end elevation of the same, taken on line 23—23 of FIG. 22;

FIG. 24 is an end elevation of the wrapper paste applying mechanism;

FIG. 28 is a plan view of the cigar trimming, knurling and delivery mechanism in conjunction with the cigar transfer device which conveys the cigar from the rolling table to the trimming device;

FIG. 29 is an end elevation of gripper fingers of the cigar transfer device;

Figure 34:
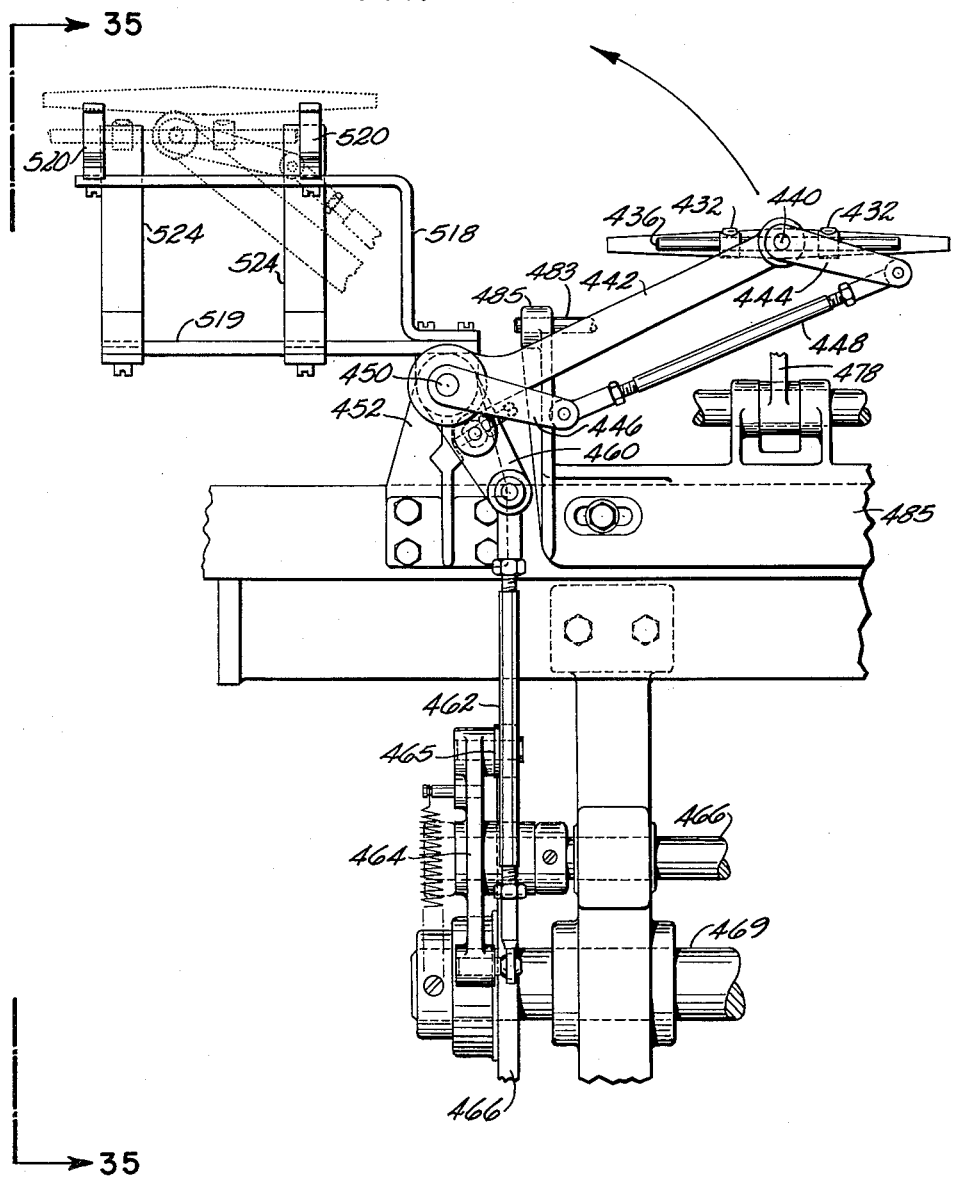

FIGS. 30 and 31 when joined on Line A—A illustrate a front elevation of the cigar trimming, knurling and delivery mechanisms and their actuating means;

FIG. 32 is an end elevation of the cigar trimming mechanism in conjunction with the scrap ejector;

FIG. 33 is an end elevation illustrating the cigar gripping and holding fingers;

FIG. 34 is a front elevation of the cigar delivery mechanisms, and

Figure 35:
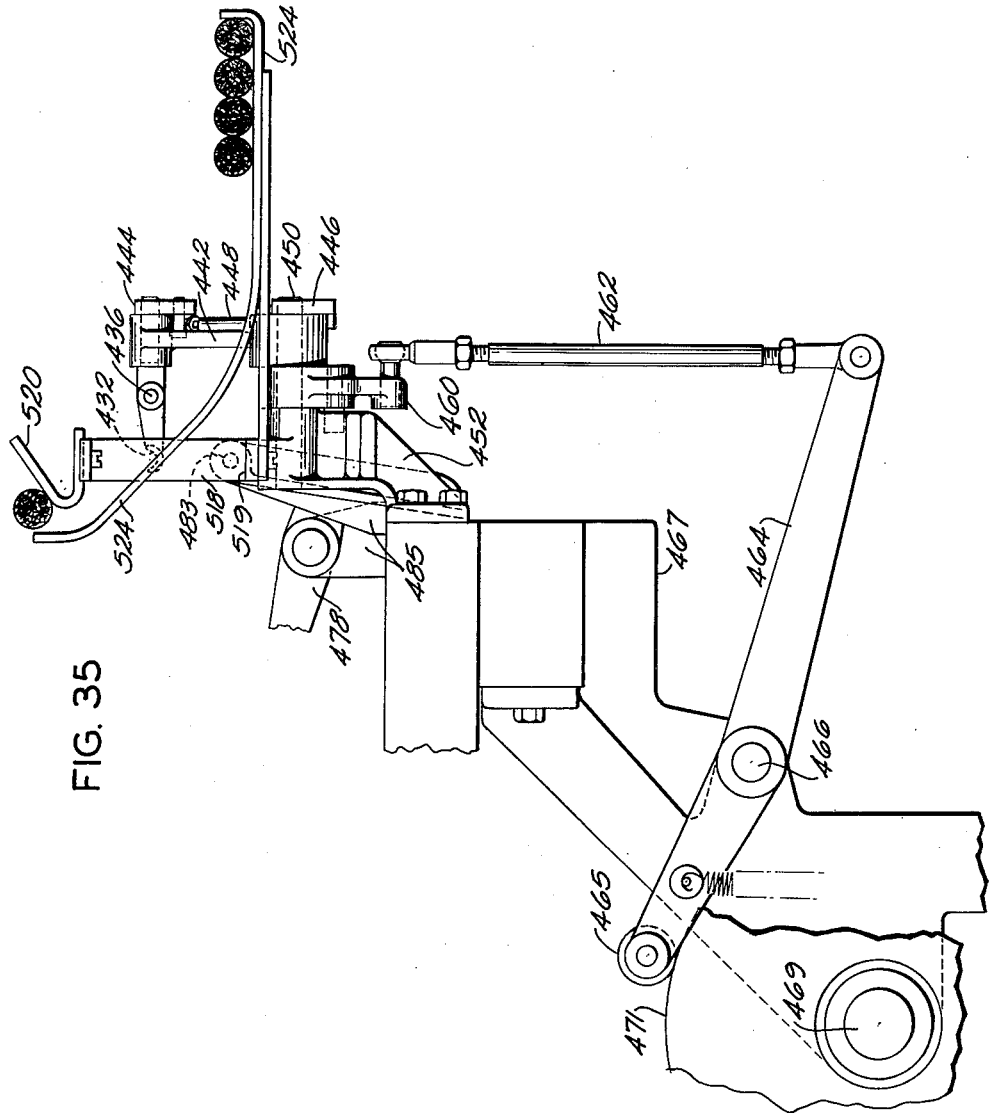

FIG. 35 is an end elevation of the same, taken on line 35—35 of FIG. 34.

In carrying the invention into effect, there is provided a wrapper die turret with two positions on one of which the wrapper leaf is placed manually and held by suction in the usual manner. The second turret position serves for cutting to shape by means of rollers traversing the wrapper die in the customary manner and from which it is picked up by the wrapper carrier. The transfer to the carrier and release from the cutting die is effected by suction with suitably timed valves, in the well known manner.

The wrapper carrier transfers the wrapper to a forming apron on the forming table, suction and suitable valving being provided to free the wrapper from the carrier and adhere it to the apron where it is suitably located to receive and to be rolled around the filler charge. While the wrapper is held in its ready position on the apron an even layer of paste is applied over its entire surface by a pasting pad of the same outline shape as the wrapper and so oriented as to fit directly over it. The pasting pad is mounted on an arm to which suitably timed vertical and horizontal motions are imparted by suitable cam and linkage means. At the retracted end of its motion the pasting pad registers with and is pressed against a paste dipper plate mounted on a slide so as to reciprocate vertically in and out of a suitable paste container, a coating of paste being transferred from the container to the dipper plate, from the dipper plate to the wrapper pasting pad and from the wrapper pasting pad to the wrapper, an even coating over the entire surface without excess being thus assured.

The tobacco filler is fed by hand into a crossfeed trough bounded by three coordinated endless belts into which the filler is placed by hand. The belts are driven in intermittent strokes from a suitable ratchet mechanism or the like so as to advance the correct length at each stroke into a receiving chamber.

A holding foot, suitably timed, descends to hold the feed down in the trough as a sharply angled guillotine knife is driven down through the filler and past a fixed ledger plate at the bottom of the feed trough. Thus a charge of the correct length, with both ends suitably tapered, is cut off from the feed column. The angulation of the guillotine knife being approximately equal to the angle of taper desired.

The base of the receiving chamber is formed by a plate arranged to swing out of the way at the correctly timed interval to permit a spring loaded pusher to descend on the charge and force it downwards into the measuring chamber, the height of the column in the measuring chamber being determined by the rates of supply and removal. When the pusher, being prevented from descending by an excess of material in the measuring chamber, fails to descend below a predetermined position the feed stroke of the crossfeed is withheld from actuation, in a manner well known in the art, withdrawal being thus allowed to overtake supply. Thus, so long as filler is placed in the crossfeeder to a greater depth than necessary for a bunch thickness in the measuring chamber, the measuring chamber is assured of being filled at each stroke with sufficient material for a charge uniformly compacted.

Metering is accomplished by a horizontal knife in combination with the measuring plunger which is caused by suitable timed linkage and cam means to cut across the stack of material at precisely the correct height to isolate a charge of the requisite amount in the bottom of the measuring chamber. In order to slice cleanly through the sticky and humid tobacco customarily used in Toscani cigars the metering knife is actuated in a swinging slicing motion rather than with a direct linear traverse. A vertically movable ledger plate forms one side of the measuring chamber, a slot wide enough to accommodate the metering knife being provided between the edge of the ledger plate and the fixed chamber wall. Generally in time with the traverse component of the metering knife motion a plurality of rods are advanced across the top of the measuring chamber, registering with slots in the bottom face of the pusher foot to prevent material in the measuring chamber from rising through adhesion to the pusher when it is withdrawn preparatory to the next stroke. The bottom of the measuring chamber is formed by the rectangular face of a plunger having a short stroke so that it may be lowered through enough distance to free the charge for later sliding. This upward motion of this plunger is adjustable to define the metered thickness of the bunch measured between the plunger and the horizontal knife. The metering knife traverse is followed up by the motion of a transverse pusher which forms the side of the measuring chamber opposite the ledger plate. The transverse pusher is suitably timed to start across just after the ledger plate has been withdrawn downward and the metering plunger is also lowered to its bottom position in the chamber just below the lower edge of the pusher. As the transverse pusher moves across it pushes the metered charge ahead of it through a space confined on the top by the metering knife and on the bottom by a composite floor made up of the measuring chamber metering plunger, the top edge of the withdrawn ledger plate and a horizontal guide plate fixed with relation to the structural frame of the machine. During the latter position of the lateral charge transfer the horizontal knife is withdrawn, a series of fixed guide bars just above it serving to keep the charge confined vertically. The face of the transverse plunger contacting the charge is shaped to conform thereto.

At the end of its transverse motion the charge is forced into a chamber in the transfer mechanism mounted on a swinging arm which, through suitable cam and linkage actuation, is moved into position to receive the charge at the required time. As the charge enters the transfer chamber a sliding pusher mounted on the transfer descends to push the charge downward into a space where it is confined on all four sides, on the top by the pusher, on both sides by the walls of the chamber and on the bottom by a swinging trap door held shut by a spring and by positive, cam actuated linkage as well. After transfer of the charge, the transverse pusher foot, the metering knife and the hold-down rods retract to their initial positions, the measuring plunger rises clear and the receiving chamber floor plate slides back into place as also do the measuring chamber floor plunger, the movable ledger plate and the angled charge cutting off knife to repeat the cycle.

As soon as the charge is contained in the transfer chamber the transfer arm swings to bring the charge directly over and in line with a receiving pocket formed in the forming apron. During the swinging motion of the arm a spring and cam mechanism serves to retract the transfer chamber containing the charge radially until it strikes an adjustable stop which is set to bring the center of the charge over the center of the receiving pocket, that is, the center between the two cones made in the rolling apron on the table as hereinafter described the correct forming of cigars of different lengths being thus provided for since the same center is used for a longer or shorter cigar. When the charge has been brought into alignment with the apron pocket the transfer chamber is lowered and the pusher is again actuated, a cam surface on the pusher slide simultaneously operating through suitable linkage to release the trap door which is thereupon forced open by a second cam surface and by the charge and the pusher. The pusher continues downward until it has compressed the charge into the apron pocket whereupon it is withdrawn through the continuing motion of its actuating cam, the slide cams acting to close the trap door, which is thus not dependent for correct closing on the relatively weak spring. Withdrawal of the transfer pusher and closing of the trap door restores the transfer mechanism parts for swinging back to receive another charge from the measuring chamber.

The rolling of the cigar is effected by means of the combination of forming table, flexible doubly curved apron and forming roller, the apron being held on the table and the wrapper on the apron by suction applied through holes in the table top and in the apron, the holes in the apron being smaller than the contacting ends of the registering holes in the table top, the differential areas thus assuring correct distribution of holding pressure on both the apron and wrapper. The suction chamber under the table top, connected to a suction pump by suitable manifolding and ducting, is divided into three chambers, the central one generally under the wrapper being arranged for on and off valving in suitable timing and the two outer ones retaining suction at all times during the operation of the machine to prevent sliding of the apron during its various motions.

The cigar is formed by advancing the roller and the apron across the table, the filler charge being thus drawn in the apron pocket and rolled up as it proceeds across the wrapper and the apron, the required double taper of the Toscani cigar being obtained by advancing first one end of the roller and then the other, apron tension being continually adjusted to provide correct compacting along the entire length of the cigar. For this purpose cams and rollers under the table top guide the roller in its traverse under the actuation of suitable cams, levers and linkage. Correct apron tension is maintained collectively and differentially between its edges by a transverse rack and pinion actuated arcuate cam system, and two independently acting and independently adjustable cam and linkage systems providing motion longitudinal of the apron edges. The roller is formed in a plurality of sections on a central pin to accommodate the different rotational speeds required of various portions of the pin due to the changing motion of its ends.

Upon completion of the rolling the cigar is placed by the apron in spring loaded fingers on a transfer arm which removes it to a cutting station where trimmer knives cut the ends to the correct length. On account of the sticky nature of the cuttings a cleaning finger is provided to assure proper displacement of the cut head end before a knurler contacts the head end of the cigar. Knurling is necessary following the trimming of the head end. The completed cigar may then be removed by a suitable transfer.

All of the above mentioned parts and means may be varied widely in construction within the scope of the claims, since the particular structure selected to illustrate the invention is but one of many possible concrete embodiments of the same. The invention therefore is not to be restricted to the precise details of the structure shown and described.

*The Filler Feed (FIGS. 5 and 6)*

The filler tobacco is fed by hand into a narrow channel formed by two spaced vertical side belts 40 and the horizontal bottom belt 42. The side belts 40 are guided by the pulleys 44 and 46, suitable guiding and tensioning devices, feed table, guide strips and cover plates (not shown) being also provided, in the manner well known in the art. The bottom belt 42 is guided by pulleys 48, 50, 52, as well as by others (not shown) receiving its driving means from a pulley 49 mounted on a shaft 51 (FIG. 2) which receives intermittent rotary motion through a pawl and ratchet system located in a housing 53 constructed in the same manner as the one shown and described in U.S. Patent No. 2,667,171. The ratchet system is actuated through an arm 55 connected through a rod 57 to a crank actuated from a suitable cam (not shown), also in the same manner as shown in the above patent.

Intermittent motion is also imparted to the side belts 40 through shafts 54 connected by suitable gears (not shown) to the intermittently rotating shaft 51. The mechanism for imparting intermittent motion to the belts is also provided with means for adjusting the length of the rotation to vary the length of the filler charge fed by said belts in the same manner as described in U.S. Patent No. 2,667,171.

*The Filler Cutoff*

The filler charge, after having been fed into a receiving chamber consisting of fixed spaced side plates 56, a fixed end supporting bracket 58 and a bottom plate 60, which is secured to an arm 62 arranged to oscillate with the shaft 64 actuated through an arm 65 (FIG. 5) which in turn is oscillated through a connecting rod 67 connected to a suitable cam lever (not shown). The arc of oscillation may be set and limited by suitably set screws 66 and 68. Shaft 64 and arm 62 are oscillated in such a manner as to cause plate 60 to form the bottom of said receiving chamber during the feeding of the stream of tobacco in the chamber and to withdraw after a length of charge is cut from said stream by means of a vertically reciprocating knife 70. Knife 70, as shown in FIGS. 2, 3 and 4, is of the guillotine type and provided with an angular edge. The knife 70 is secured to a vertical slide 73, supported by an adjustable gib 75 of a bracket 77. Slide 73 through link 79 on stud 79a, arm 81, shaft 83, lever 85 and rod 87 is actuated from a suitable cam (not shown). The arm 81 carries a cam lug 89 which engages a cam roller 91 on a pivoted cam arm 93 which through spring 95 resiliently connects to a lever 97 from which is removably suspended a pressure foot assembly P. The pressure assembly P is suspended into the feed channel and is employed to compact the tobacco stream during the cutting of the charge by knife 70.

A fixed ledger plate 72 co-acts with knife 70 in cleanly shearing the filler charge from the feed.

The Charge Measuring

After the charge is cut off to the required length, the angular cut of the knife 70 having given it a double-tapered form necessary for the Toscani type of cigar, the plate 60 is withdrawn and a vertical charge density plunger 74 descends and forces the charge from the receiving chamber into a measuring chamber. Plunger 74 is secured to the lower end of a vertical shaft 78 held by bearings in bracket 77a. Shaft 78 through a collar 41 is suspended from a grooved sleeve 43 in engaging with the rollers 45 carried by arm 47 secured to an oscillating shaft 49 actuated by an arm 51a and a rod 53 connected to a cam (not shown). To shaft 78 is also secured a lug 55 which through a compression spring 57 surrounding shaft 78 contacts the lower face of sleeve 43 thus providing resilient pressure to the charge density plunger 74 as during its downward stroke pushes the tobacco from the receiving chamber into the measuring chamber.

The measuring chamber, FIG. 13, is formed by one of the plates 56, a side plate 80, a transverse pusher 84 and the bottom measuring plunger 82. Charge lengths so fed form a vertical column in the measuring chamber with the material left over from previous measuring operations.

Figure 1:
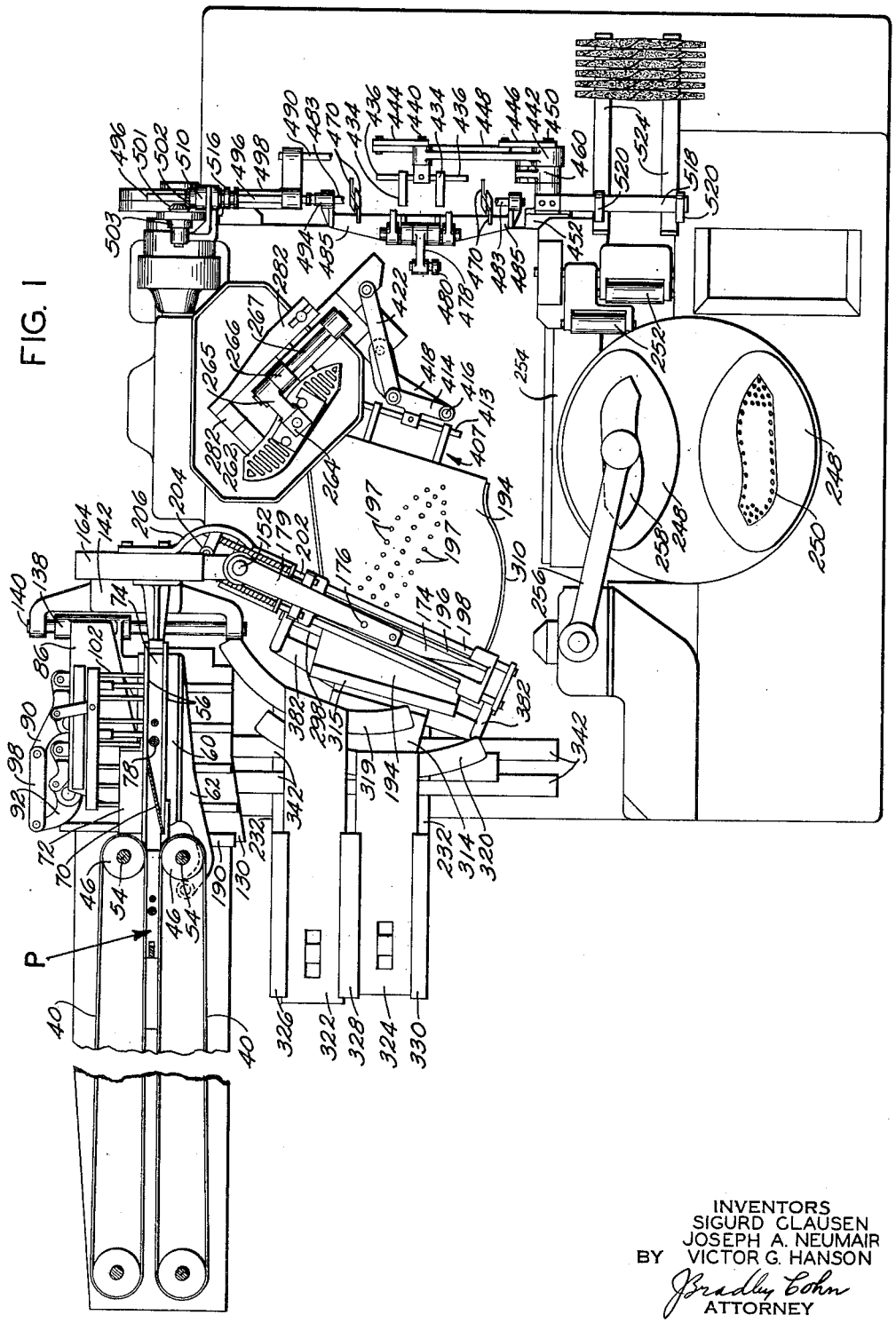
FIG. 1 is a plan view of the Toscani cigar making machine illustrating the outlines of the various components and mechanisms and their relation to each other.
Figure 7:
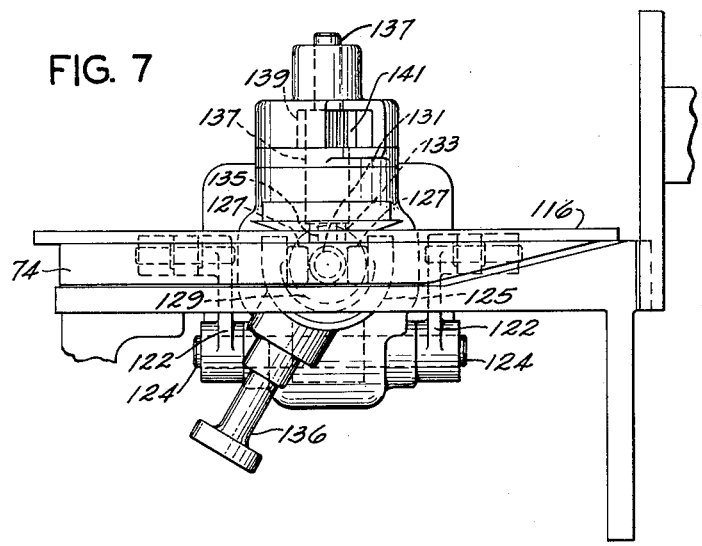
FIG. 7 is a plan view of the same, taken on line 7—7 of FIG. 6.
Figure 8:
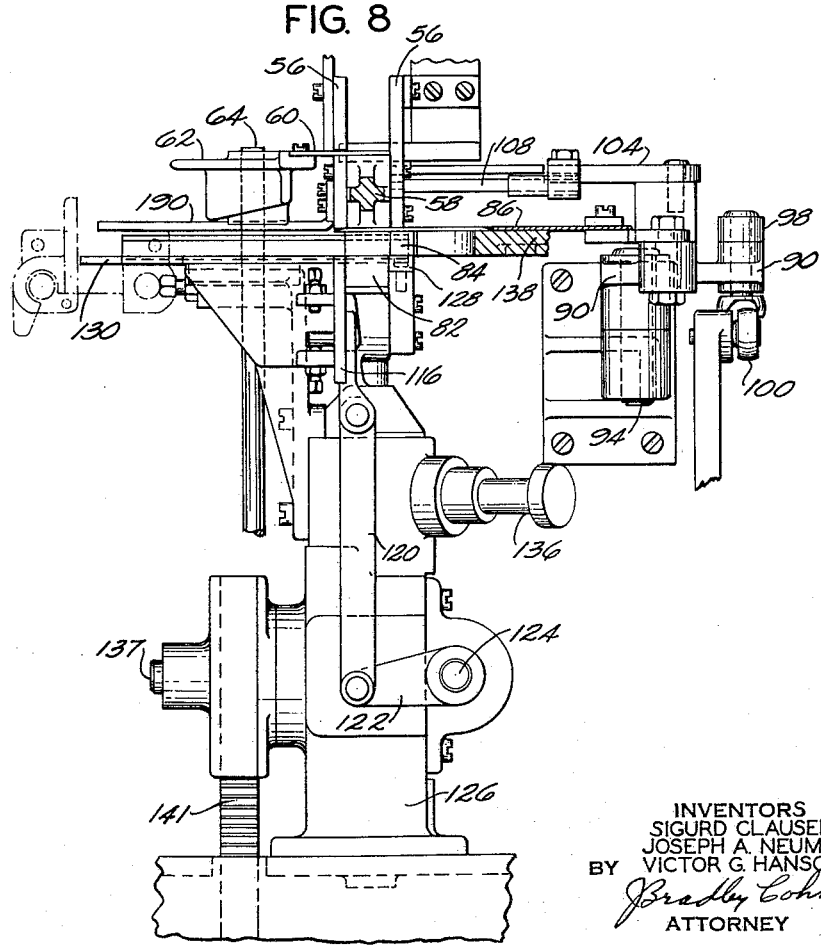
FIG. 8 is an end elevation, partly in section of the charge measuring device and the horizontal cutting and transfer mechanism, taken on line 8—8 of FIG. 6.
Figure 25:
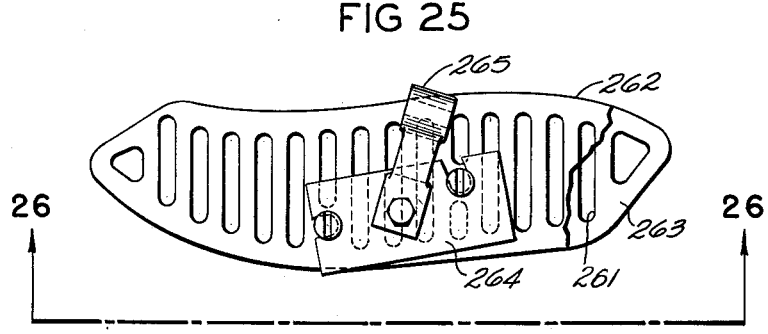
FIG. 25 is a plan view of the paste transfer and applier plate.
Figure 26:
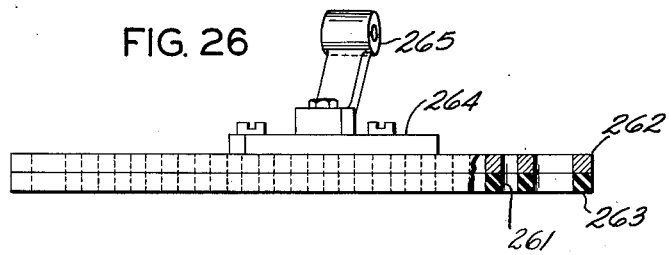
FIG. 26 is a front view of the same, taken on line 26—26 of FIG. 25.
Figure 27:
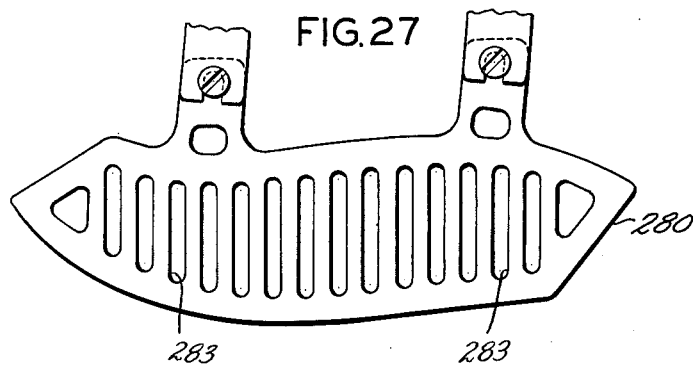
FIG. 27 is a plan view of the paste lift platform.

A transverse knife 86 is next forced horizontally through the stack 88 with a slicing motion imparted by the knife driver levers 90 and 92 which are mounted to rotate on fixed pivots 94 and 96 and are actuated by connecting link 98 and the adjustable driving link 100, pivotally connected to a suitable cam lever 101, the correct timing being established by suitable cam means on the main drive of the machine. The horizontal knife 86 being set at a fixed height above the bottom of the measuring chamber established by the bottom or measuring plunger 82, the height of the charge cut off from the column and retained in the measuring chamber is always of a constant volume, which is adjustable by changing the height to which measuring plunger 82 rises. After descent of the vertical plunger 74 the retaining fingers 102 are projected across above the measuring chamber, being actuated by a link 104 from the knife actuating levers 90 and 92. The fingers 102 are supported in the bar 106, which is guided by the guide rods 108, and pass through holes 110 in the side plate 56 and slots 112 in the lower part of the vertical plunger 74. Two of the end fingers 102 pass also through holes in plate 80 (below one of the plates 56) to assure complete holding down of the thin tapered end of the measured charge. The link 104 is provided with a slot 114 at its pivotal attachment to bar 106 the double objective being thereby attained of reducing the stroke of fingers 102 relative to knife 86 and of introducing the required timing lag. The vertical density plunger 74 is withdrawn immediately after the knife 86 has completed its cutting movement, the fingers 102 preventing tobacco which may adhere to said plunger 74 from being carried upward with it. As plunger 74 nears the top of its withdrawal stroke the plate 60 is returned to its initial position, FIG. 14, and the receiving chamber is ready for a new charge to be injected by the feed belts. Cooperating with the transverse knife 86 is a vertically movable ledger plate 116 which is arranged for vertical travel as actuated by the links 120 connected to an arm 122, FIGS. 7 and 8, mounted on a shaft 124 oscillated by means of a forked lever 125 carrying roller 127 engaging with a grooved sleeve 129 loose on a vertical shaft 131. Sleeve 129 is also engaged by a roller 133 (FIG. 7) carried by an eccentric pin 135 at the end of a shaft 137 oscillated by a gear 139 and rack 141 from a suitable cam (not shown). The entire mechanism is supported in a housing 126 mounted on the bed of the machine.

The Charge Transfer

After the knife 86 has cut off the measured charge the measuring plunger 82 is caused to move downward flush with a plate 130 to free the charge for transfer, the bottom of the stroke of the plunger 82 always bringing it flush with the fixed guide 128 and the fixed horidontal guide plate 130. The plunger 82 is supported on the Y-column 132 to which the required reciprocating motion is imparted by a suitable cam, gear, crank mechanism contained in the housing 126. Adjustment for varying the height to which measuring plunger 82 rises is effected by turning the adjusting knob 136. The arrangement of the plunger 82 actuating and adjusting mechanism is similar to that shown for the same purpose in U.S. Patent 2,470,766.

The horizontal pusher 84 next moves forward, its extension arm 138 being slidable on the guide rod 140 supported in the fixed yoke 142 which is bolted to the supporting frame member 164 (FIGS. 5 and 6). The pusher 84 is driven through a link 146 by a lever 147 which reciprocates under the driving impetus provided by suitable cam means in the main drive of the machine. The limits of travel of the pusher 84 are established by the adjustment screws 143. As the transfer pusher 84 advances it pushes the measured charge C out of the measuring chamber, across the upper edge of the movable ledger plate 116, which has been retracted to a position flush with the fixed guide plate 130, and across the plate 130 into a chamber of a horizontal swing transfer 150.

The purpose of the horizontal swing transfer 150 is to receive the measured charge C from the measuring chamber, swing it into position over the rolling apron, center it longitudinally and place it in the pocket in the apron at the rolling table.

The swinging motion of transfer 150 takes place about shaft 152 and is actuated by a driving rod 154, FIGS. 10 and 11, loosely pivoted lever 156, squared slide 158 and arm 159 engaging slide 158 and secured to shaft 152. Shaft 152 is journaled at 160 and 162 in the supporting bracket 164 which is fixed on the main table frame 272. Lever 156 is retained against vertical motion by flange 168 and a retaining lug 170. When the transfer 150 is in position to receive a measured charge, the plate 172 of transfer 150 is brought into contact with the edge of the guide plate 130 to fit flush to receive the charge (as illustrated in FIGS. 13 and 14).

The charge C is caused to slide on plate 130 over the top edge of plate 172 by the pusher 84 to a position under a transfer plunger 174 which is arranged for vertical reciprocation, being actuated by pusher rods 176 guided in swinging arm 179 secured to shaft 152. The pusher rods 176 are secured in the block 178 which is actuated by link 180, lever 182, collar 184, lever 186 and drive rod 188 leading to suitable cam means in the main drive. When the charge C has cleared edge 172 plunger 174 descends and compresses the charge in the chamber 196 of the lower part of transfer 150, as shown particularly in FIG. 14. After the charge C is moved across guide plate 130 knife 86 is withdrawn, fixed guide bars 190 being provided just above knife 86 to held the charge down during transferring. Pusher 84, measuring plunger 82 and ledger plate 116 move back into their initial positions ready for another cycle after the charge has moved into the swing transfer 150.

The swing transfer mechanism is next actuated to bring the charge directly over and in line with the pocket 192 formed in the rolling apron 194 adjacent the leading edge of rolling table 148. During the swinging motion the chamber 196 of transfer 150 containing the charge is moved radially to bring the center of the charge in alignment with the center of the apron. This is accomplished by mounting the chamber 196 to slide on rods 198 secured in swinging arm 179. A block 200, also slidable on rods 198 is secured to chamber 196 by two rods 202 and carries a roller 204 arranged to cooperate with an arcuate cam bar 206. Roller 204 and chamber 196 are urged radially inward by springs 208 until either roller 204 bears on cam bar 206 or chamber 196 engages adjustable stop screw 210, depending on the position in its swing of transfer arm 150. Thus, when in position to receive the charge, FIG. 5, the roller 204 is in contact with cam 206 and the receptacle 196 is held in position to receive the charge. As the arm swings and roller 204 moves along the cam, receptacle 196 is moved radially inward by the springs 208 until it engages stop screw 210, further inward radial movement being thereby prevented and roller 204 leaving cam 206 during the remainder of the swinging stroke. Adjustment of screw 210 thus determines the amount of radial displacement of the charge which takes place during the swing and consequently provides a means of centering the charge longitudinally.

When the charge is in position over the apron pocket 192, the shaft 152 carrying the entire transfer 150 with its attached mechanism is displaced downwardly by actuation of drive rod 212 from a suitable cam in the main drive, the motion being transmitted through bell crank 214, link 216, toggle links 218 and 220, lever 222 and collar flanges 224 integral with arm 159 (FIGS. 10, 11 and 12). The transfer chamber 196 carrying the charge C is thus brought down into close proximity with the apron pocket 192. The next operation is a further downward thrust of transfer plunger 174 under the impetus of cam action on rod 188 imparted through the linkage previously described. The bottom closure of the chamber in which charge C is contained at the start of the plunger stroke is formed by a trap door 226 which is pivoted on receptacle 196 by stud 228 and is retained in the closed position by spring 230 and also by a positive system comprising link 232, lever arm 234 mounted on stud shaft 236, a lever 237 also mounted on stud 236, cam block 238 adjustably mounted on block 178 and a cam block 240 mounted on the plunger 174. The arm 242 carried by lever arm 234 supports a roller 244 arranged to be acted on by cam block 240, while the upper end of lever 237 carries roller 246, engaging the cam lock 238. As plunger 174 moves down, cam block 238 moves with it, causing cam roller 246 to roll onto a low portion of the cam and shortly thereafter cam block 240 engages roller 244 thus causing lever 234 to swing to cause, through link 232, the trap door 226 to swing open as illustrated in FIG. 15. During the final portion of the stroke of plunger 174 trap door 226 is held open by contact with the plunger 174. Opening of trap door 226 allows the charge C to descend into apron pocket 192 where it is compressed into place by plunger 174 at the point of its maximum extension. After thus depositing the charge C in place in the apron pocket 192 the plunger 174 ascends again. During the upward motion of the latter, cam block 238 engages roller 246, thereby causing trap door 226 to close in a positive manner. Previously, in similar transfer devices a spring has been relied on to close the trap door after discharge of the charge. This has, however, proved unreliable, particularly with the moist sticky tobacco customarily provided for Toscani cigars. On account of blocking by adherent shreds of tobacco, the employment of the positively actuated closure is an important novel feature of the present invention in that it has been found in practice that the positively impelled trap door cuts through obstructions successfully and thus adds greatly to the reliability and continuity of operation of the machine.

The Wrapper Cutter and Carrier

During the time occupied by the above described actions the wrapper is cut to shape and placed on the rolling apron. The means employed for this purpose are of the customary type and comprise a turret 248 which carries two cutting dies 250, one of which is in position for manual charging with a selected wrapper leaf and the other of which has been rotated into cutting position, a slide 254 resiliently supporting cutting rollers 252 to traverse the cutting die, and a wrapper transfer arm 256 with a wrapper carrying head 258 pivotally mounted at its end. The operation, being entirely conventional, requires only a brief description here. The turret 248 carrying the leaf strip is rotated to bring it into the cutting position in the path of the rollers 252. It is then picked up by the wrapper carrier head 258 and swung by the arm 256 into the correct position for depositing on the rolling apron 194, the holding and releasing at the various positions being accomplished by valved suction, in the usual way.

The Pasting Mechanism (FIGS. 1, and 22–27)

After the wrapper is placed on the rolling apron the upper surface of the wrapper is coated with a uniform layer of paste which is applied by a sponge rubber pad 263 mounted on a plate 262 detachably held by a block 264 secured to arm 265 mounted on a shaft 267 carried at the free end of a transfer arm 266. Arm 266 is pivotally supported by a stud 268 held by bracket 270 fixed on the bed plate 272 of the main frame of the machine. Arm 266 is arranged to be rotated about stud 268 by a lever 274 also mounted on said stud. Lever 274 through an adjustable rod 276 is oscillated by and connected to a suitable cam arrangement (not shown). An adjustable rod 278 is pivotally connected at its lower end to a stud 281 on bracket 270 and at its upper end is connected to the free end of an arm 269 mounted to the stud shaft 267. A paste dipper plate 280 secured to a support 282 is raised and lowered by cam actuated rod 286, acting through swinging arms 288 and 289 which are pivoted on bracket 270 at 290 and 292, respectively. The sequence of operation is as follows: Rod 286 is actuated to lower plate 280 into a stationary paste pot 294 and then raised above the paste pot 294, transferring the paste carried on its top surface to the lower surface of the rubber pad 263 on plate 262 of the waiting paste transfer arm 266. The dipper plate 280 then descends again and the transfer arm 266 swings the paste carrying rubber pad 263 on to the top surface of the wrapper W previously deposited on the rolling apron 194. The applicator 263 being of the same shape as the cut wrapper W and being of a resilient material such as rubber permits paste to be transferred onto the entire surface of the wrapper regardless of heavy veins or irregularities of the surface of the wrapper W. The dipper plate 280 is perforated at 283 for drainage to assure a correct supply of paste whenever excess is delivered to pad 263, which also has corresponding openings 261 or perforations.

The Cigar Forming Mechanism

The cigar forming mechanism consists of an S-shaped curved table 148, over which lies the correspondingly shaped rolling apron 194, the rolling pin 298, suitable apron shifting and stretching means, and suitable roller pin actuating and control mechanism.

The rolling table 148 is provided with a detachable perforated cover plate 310 which covers a three compartmented housing of which the two outer compartments 300 and 302 are at all times in communication with a source of suction through a duct 304 connected by a suitable tube 305 to a source of suction (not shown). The two compartments 300 and 302 are connected to each other by a duct 301 as illustrated in FIG. 16. The central compartment 306, through duct 308, is connected to a cam actuated suction valve (not shown) which applies and shuts off suction as required to hold and release the wrapper. The rolling table cover plate 310 is detachably secured to the top of rolling table 148 to furnish a flat surface to roll the cigar on and to support the rolling apron 194. It is perforated in a definite pattern to permit the apron 194 and the wrapper thereon to be held by sufficient suction. The perforation holes 195 (FIG. 20) are made conical in form so as to present a larger area at the upper surface of cover plate 310 than at the under surface, whereby a relatively large suction surface is applied to apron 194 while only a small volume of air is drawn in when a hole is uncovered. In order to provide means for positive adherence of both the wrapper W to the apron 194 and the apron 194 to the table cover plate 310, the holes 195 in cover plate 310 have a larger diameter than the holes 197 of the apron 194 as illustrated more clearly in the enlarged detail showing of FIG. 20. The wrapper W is held by suction through the small holes 197 of the apron. Said small holes are centered over larger holes 195 in the cover plate. Thus the larger holes 195 apply suction both to the apron 194 and the wrapper W by virtue of the different size of the holes as illustrated in FIG. 20. This is apart from the purpose of the conical form of the hole 195, which is provided to reduce bleeding of the system as the apron is lifted from cover plate 310 during the rolling operation. The cover plate 310 above chambers 300 and 302 are provided with holes generally uniformly spaced while over the area covering the central chamber 306 the holes are spaced more closely and in a pattern conforming to the shape of the cut wrapper as clearly illustrated in FIG. 19.

The rolling apron 194 is secured at one end to the rolling table 148 by the clamp strip 312 and at the other end by a clamp 315 to an apron control plate 314. To the control plate 314 are pivotally held cam rollers 316 and 318 engaging the arcuate cams 319 and 320 respectively which are in turn rigidly secured to slide plates 322 and 324, respectively, adapted to slide in grooves of guide rails 326, 328 and 330 secured to brackets 232 mounted on bed plate 272 of the machine. A third cam roller 334 on the apron control plate 314 engages with a track 336 in a plate 338 secured on a gear rack 340 adapted to slide between the cross guide rails 342. The gear rack 340 is reciprocated by a gear 344 secured on a shaft 346. The slides 322 and 324 are adjustably connected through blocks 348, links 350 and bell crank levers 352 to the two actuating rods 354, which through bell cranks 356 are arranged to be oscillated by cams 358 on the main cam shaft 360.

Bell crank levers 352 are loosely supported on a horizontal shaft 351 which at both ends is slidably supported in slots 353 of bracket 232. The ends of said shaft through a pair of links 355 are connected to an eccentric shaft 357 which by turning effects through link 355 a lateral movement of shaft 351 which represents the pivot point for bell crank lever 352 which in turn controls the movement of the slides 322 and 324. This arrangement provides a convenient and novel adjustment to position both slides 322 and 324 at the same time. This adjustment effects an increase or decrease of the tension on the rolling apron or more accurately to increase or decrease the diameter of the rolled bunch. In order to increase or decrease the tension at each side edge of the apron individually to achieve proper rolling of each individual conical end of the cigar, each slide may be adjusted individually by means of a spindle 341 (FIGS. 16, 17 and 21) rotatably held by a plate 343 at the end of each slide. Each spindle engages with one of the blocks 348 adjustably secured to each individual slide by means of a bolt 345 as shown in FIG. 17. For this purpose each slide is provided with a slot 347. A third cam 362 on cam shaft 360 actuates bell crank 364 which carries an adjustable arm 366 to which is pivoted an adjustable rod 368 by which arm 366 is interlinked to arm 370 mounted on a shaft 372.

In order to provide adjusting means to increase or decrease the angularity of the individual cone portions at each end of the cigar which is affected by the side swing of the apron controlled by the rack 340, the arm 363 is adjustably secured to the bell crank 364 by means of a pair of screws 367 and an adjustment spindle 369 as shown in FIG. 18. A turning of adjustment spindle 369 either lengthens or shortens arm 366 which in turn affects a lengthening or shortening of the stroke transmitted through rod 368, lever 374 and rod 376 to the gear rack 378 representing the actuating means of the rack 340. To shaft 372 is also secured and parallel spaced to arm 370 another arm 374 which through rod 376 is connected to a gear rack 378. Rack 378 engages with and oscillates a gear 380 secured to shaft 346 mentioned above. Thus the rotation of shaft 360 actuates three components of motion of apron control plate 314: transverse motion, causing the rollers 316 and 318 to move around in the arcuate cams 319 and 320; longitudinal motion of slide 324, causing a displacement of cam 320; and longitudinal motion of slide 322, causing a similar displacement of cam 319. Thus, when the two slides 322 and 324 move in unison a general tightening or loosening of apron 194 ensues; when they are moved differentially one edge of apron 194 is tightened and the other loosened to increase or decrease the ends of the bunch; and when rack 340 is moved the head of apron 194 is shifted laterally, the arcuate form of cams 319 and 320 preventing in general any tightening or loosening occurring as a consequence of the lateral shift.

The rolling pin 298, which is composed of a plurality of rollers employed to prevent undue friction due to difference in speed of opposed edges of the apron during the rolling of the conical portions of the cigar bunch, is mounted in a forked arm 382 bridged beneath the rolling table 148 and is attached to a plate 381 carrying cam rollers 384 and 386 engaged in cam tracks 388 and 390 formed in the bottom flange 387 of the rolling table 148. Forked lever 382 is connected by adjustable link 392 to a lug 394 adjustable to the end of lever 396. Lever 396 is arranged to swing about a fixed pivot 398 and is connected adjustably to one end of a link 400 while its other end is connected to a bell crank 402, which in turn is arranged for actuation by cam roller 404 in engagement with cam 406 on the main shaft 360. Thus, rotation of shaft 360 causes rolling pin 298 to move across table cover plate 310 causing a charge to be rolled in the wrapper on the apron 194, the cam tracks 388 and 390 causing a conical loop to be formed first on one side of the apron and then on the other, thus a double cone shape is rolled by the S-shaped apron and rolling pin. Thus the traverse of the rolling pin 298 from the position shown in FIG. 18 causes the filler charge C in the apron pocket 192 to be rolled over the table top 310 and rolled across it in the fold of apron 194, the wrapper on the apron 194 being spirally wrapped around it at the same time and the combination of the three motions of the shifter head 314 together with the swinging of rolling pin 298 packing tightly first one conical end of the cigar and then the other. The sequence of rolling operation is generally similar to those described and illustrated in U.S. Patent No. 1,586,330, the differential edge adjusting which is a novel feature of the present invention, however, providing better control of the motion sequence and consequently an improved product.

A pair of springs 408 are employed for the purpose of providing tension to the rolling apron during the last portion of the rolling action to the ejecting (FIG. 29) of the bunch from the apron at which time the cam rollers leave the open track of cams 358 and drop into a suitable cutout in said cams to effect such tension. The springs 408 through the linkage described heretofore urge the apron control plate 314 backward which in turn pulls the apron backward and taut and thus stretches the apron between the rolling pin 298 and the clamp plate 312 in a manner shown in FIG. 29 so a positive ejecting means for the cigar from the apron into the spring mounted jaws 407 of a cigar transfer is effected.

It is necessary occasionally to clean accumulations of surplus paste from the rolling table compartments. Ready accessibility is therefore important and a novel feature of the present invention is the retention of the rolling table cover plate 310 by ball snap fasteners 410 FIG. 16.

The Trimming, Knurling and Delivery Mechanism
(FIGS. 28, 30–35 Inclusive)

The cigar, after forming, is rolled off the end of the rolling table 194 into the jaws 407 which consist of a pair of supporting fingers 409 working in conjunction with a pair of spring-loaded gripper fingers 411. The gripper jaws 407 are adjustably secured on a horizontal rod 413, held by a lug 412 formed integrally with a transfer member 414, which is at one end pivotally mounted on a stud 416 held by an arm or lever 418 and the other end of said member 414 by means of a stud 420 connected to one end of a link or lever 422 which is pivoted at its other end to the fixed bracket 270. Arm 418 is secured to shaft 424 journaled in a suitable bearing of bracket 270 and carrying at its lower end, the gear 426 which meshes with gear sector 428 pivotally supported on a stud shaft 429 held by bracket 270. The gear sector 428 is provided with an arm 430 which through suitable connecting rod 431 is connected to and actuated by a suitable cam arrangement (not shown).

Oscillation of gear sector 428 causes arm 418, link 422 and link 414 to swing around to the dotted position shown in FIG. 28, which brings the cigar, in reversed position, over the open cradle fingers 432 which are adjustably mounted on a shaft 436. Shaft 436 is supported in a block 438 secured to a shaft 440 which is rotatably mounted in the free end of arm 442 secured to a shaft 450 supported by a bearing bracket 452 mounted on the bed plate of the machine. To shaft 440 is mounted a lever 444 which by means of a rod 448 is connected to a lever 446 also mounted on shaft 450. Rod 448 and levers 444 and 446 acting as a parallelogram for the cradle fingers 432 during swinging motion of arm 442. To shaft 450 is mounted furthermore an arm 460 which through a rod 462 is connected to a cam lever 464 pivotally mounted on a stud 466 held by a suitable bracket 467. Cam lever 464 carries a cam roller 465 engaging with a cam 471 mounted on a suitable cam shaft 469.

As the cigar is held by the jaws 407 of the transfer in position above the cradle fingers 432, cam lever 464 effects an upward motion to the same so that the cigar is lifted out of the jaws 407 and supported in cradle fingers 432. The fingers 432 carrying the cigar dwell for a short period above the transfer jaws 407 until the latter move out of the way to their starting position upon which cradle fingers 432 will lower the cigar into a pair of cam actuated gripping fingers 482 loosely supported on a horizontal shaft 483 held by a suitable bracket 485 mounted on the bed plate of the machine. Each gripping finger 482 by means of rods 487 are connected to a cam arm 489 pivotally mounted on shaft 491. Cam lever 489 carries a cam roller 493 engaging with a cam 495 which effects an opening and closing of gripping fingers 482 mentioned above.

While the cigar is lowered into the cigar fingers 482 the ends of the cigar project beyond the shearing edges 468 of two pairs of spaced trimming knives 470. The shearing knives are adjustably mounted on arms 472 which are pivotally mounted on shaft 483 and are arranged for shearing action, through toggle links 476, by lever 478 and adjustable rod 480 leading to a cam arm 481 loosely mounted on shaft 491. Cam arm 481 carries a cam roller 479 engaging with a cam 477 mounted on a cam shaft 475 to which is also mounted the cam 495 (FIG. 31).

The head of the cigar, which carries the loose end of the wrapper, must be knurled after cutting to assure a smooth finish. However, the sticky nature of the tobacco and the paste which is still not set create a difficulty in that the trimmings of the cigar tend to adhere to the cutters and thus remain in the path of the knurler. A novel feature of the present invention is a provision for avoiding this difficulty. To this end a plate 434 is mounted adjacent head end knives 470 to swing pivotally about the shaft 483 and is cam actuated through link 484 to reciprocate to displace the trimmings after the knives have closed, removing them to one side where a resilient leaf spring member 486 engages it and sweeps plate 434 clean. Member 486 is held in arm 488 which is arranged to swing about the fixed pivot 490 and which is cam actuated through link 492. Plate 434 remains in its raised position until knives 470 having re-opened the cigar end is knurled.

The knurling mechanism consists of a knurling head 494 mounted on shaft 496, journaled in the fixed bracket 498, and is maintained in continuous rotation by the V-belt 500 and pulley 503 through bevel gears 501 and 502, belt 500 being driven by shaft 504 and a pulley 506 on shaft 504. The latter in turn is driven by another pulley 507 through a belt 509 from a suitable motor (not shown). As soon as the knives 470 have been opened, knurling head 494 is advanced, shaft 496 being slidably mounted in journals 508 and 510 and also being slidable axially but not rotationally relative to the bevel gear 502. The axial motion of shaft 496 is derived from suitable cam actuation through rod 512, bell crank 514 and collar 516. Rotation of shaft 496 is in the direction tending to tighten the wrapper winding as the knurling head 494 slips over the cigar end.

Rod 512 on its lower end is connected to an arm 515 loosely mounted on shaft 491. Arm 515 is provided with a cam lever 517 carrying a roller 519 which engages with a cam 521 mounted on a shaft 475. The stud shaft 523 which connects the rod 512 to arm 515 is provided with an extension 525 which engages with the links 484 and 492 which actuate the sweep plate 434 and sweeper arm 488 respectively.

The cigar is now finished and ready to be discharged from the machine.

For this purpose the gripper fingers 482 open and cradle fingers 432 move upward and lift the cigar out of the jaws 482.

The continued upward swinging motion of arm 442 in the direction shown in FIG. 34 causes the finished cigar to be transferred to a delivery station as shown in dotted lines in FIG. 34. At this station the cigar engages with a pair of spaced fixed stripper bars 520 mounted on a suitable bracket 518 secured to a plate 519 mounted on bracket 452. After the finished cigar contacts stripper bars 520 the cradle moves slightly downward to permit said cigar to disengage from said cradle 432 and roll onto a suitably curved delivery runway consisting of a pair of rails 524 supported by the plate 519.

What is claimed is:

1. In a cigar machine, a measuring chamber adapted to supply a measured filler charge, a movably mounted receptacle, means adapted to transfer said measured charge to said receptacle, a forming table, a forming apron on said forming table, a pocket in said apron, means adapted to move said transfer receptacle to a position over said pocket, means adapted to move said receptacle longitudinally of itself and crosswise of said apron so as to center said charge over said apron, and means adapted to expel said charge from said receptacle into said apron pocket.

2. In a Toscani cigar machine, a measuring chamber adapted to supply a measured filler charge, a pivotally mounted arm, a receptacle slidably mounted on said arm, means adapted to transfer said measured charge to said receptacle, a forming table, a forming apron on said forming table, a pocket in said apron, means adapted to swing said arm to a position aligned with said pocket, means adapted to move said receptacle longitudinally along said arm and transversely across said apron whereby said charge is centered with relation to said apron, and means adapted to expel said charge from said receptacle into said pocket.

3. In a Toscani cigar machine, a measuring chamber adapted to supply a measured filler charge, a pivotally mounted arm, a receptacle slidably mounted on said arm, means adapted to transfer said measured charge to said receptacle, a forming table, a forming apron on said forming table, a pocket in said apron, means adapted to swing said arm to a position aligned with said pocket, means adapted to move said receptacle along said aligned arm longitudinally of said pocket, means adapted to limit adjustably the amount of movement of said receptacle along said arm, and means adapted to expel said charge from said receptacle into said pocket.

4. In a cigar machine, a measuring chamber adapted to supply a measured filler charge, a supporting structure, a transfer arm mounted on said structure and adapted to swing relative to it, a receptacle slidably mounted on said arm, a fixed cam member mounted on said structure, a roller on said receptacle adapted to engage said cam member, a spring adapted to urge said roller against said cam member whereby said receptacle is caused to slide along said arm as said arm is swung, an adjustable stop on said arm adapted to engage said receptacle thereby limiting the sliding displacement of said receptacle on said arm, said roller leaving said cam when said arm is swung beyond the point of engagement of said stop, means adapted to transfer said measured charge from said measuring chamber to said receptacle, a forming table, a forming apron on said forming table, a pocket in said apron, means adapted to swing said arm from a position in which said receptacle is adjacent said measuring chamber to a position in which it is aligned with said pocket, and means adapted to expel said charge from said receptacle into said pocket.

5. In a cigar machine, a measuring chamber adapted to supply a measured filler charge, a movably mounted receptacle, means adapted to transfer said measured charge from said chamber to said receptacle, a forming table, a forming apron on said table, a pocket in said apron, means adapted to move said receptacle into alignment with said pocket, a trap door forming the bottom of said receptacle, means adapted to open said trap door, means adapted to expel said charge past said trap door into said pocket, mechanism operated by said expulsion means to positively engage and close said trap door after the expulsion of said charge.

6. In a cigar machine, a measuring chamber adapted to supply a measured filler charge, a movably mounted receptacle, means adapted to transfer said measured charge from said chamber to said receptacle, a forming table, a forming apron on said table, a pocket in said apron, means adapted to move said receptacle into alignment with said pocket, a trap door forming the bottom of said receptacle, a pusher arranged for motion through said receptacle, cam means mounted on said pusher, means mounted on said receptacle adapted to engage said cam means and to actuate said trap door, whereby said trap door is positively opened and closed by motion of said pusher, said pusher being adapted to expel said charge from said receptacle into said pocket.

7. In a Toscani cigar machine, a forming table, a forming apron on said table, a forming roller adapted to traverse said table, means adapted to supply a filler charge on said apron, means adapted to supply a wrapper to said apron, means adapted to impel said roller along said table whereby said filler charge is rolled in said wrapper in a fold of said apron to form a cigar, an apron header, said apron having lateral edges and being secured to said table at one end and to said header at the other end, means adapted to displace said header transversely of the traverse of said roller, and mechanisms adapted to displace said header longitudinally of the traverse of said roller, and to rotate said header about a predetermined point to selectively vary the relative tension along the edges of said apron in any locus of said header during said longitudinal and/or rotative displacement.

8. In a cigar machine, a forming table, a forming apron on said table, a forming roller, means adapted to supply a filler charge to said apron, means adapted to supply a wrapper to said apron, means adapted to impel said roller along said table whereby said filler charge is rolled in said wrapper in a fold of said apron to form a cigar, said apron being free at one end and secured to said table at the other end, means adapted to apply tensioning force to said apron, means adapted to displace the free end of said apron laterally, and means engaging said free end and adapted to apply stretching force alternately to each edge of said apron independently of the lateral adjustment of said apron.

9. In a Toscani cigar machine, a forming table, a forming apron on said table, a forming roller, means adapted to supply a filler charge to said apron, means adapted to supply a wrapper to said apron, means adapted to impel said roller along said table whereby said filler charge is rolled in said wrapper in a fold of said apron to form a cigar, said apron being free at one end and secured to said table at the other end, a header on the free end of said apron, means adapted to move said header laterally, two rollers on said header, two members formed with arcuate slots, one of said rollers being adapted to co-operate with each of said slots, two slides arranged for longitudinal motion, one of said slotted members being fixed on each of said slides, and means adapted to move said slides independently of each other or together, whereby tension may be applied to the edges of said apron differentially or in unison during the cigar forming operation.

10. In a cigar machine, a forming table, a forming apron on said table, a forming roller, means adapted to supply a filler charge to said apron, means adapted to supply a wrapper to said apron, three suction chambers in said table, the central one of said chambers being located under the wrapper position and the two lateral chambers being located under portions of said apron not covered by said wrapper, holes in said table connecting said chambers with the top of said table, holes in said apron under said wrapper position, means adaptable to communicate said lateral chambers to a source of suction, and separate means adaptable to communicate said central chamber to a source of suction whereby suction may be applied continuously to said lateral chambers and discontinuously to said central chamber, and means adapted to impel said roller along said table whereby said filler charge is rolled in said wrapper to form a cigar.

11. In a Toscani cigar machine, a forming table, a forming apron on said table, a forming roller, means adapted to supply a filler charge to said apron, means adapted to supply a wrapper to said apron, means adapted to impel said roller along said table to roll said filler charge in said wrapper to form a cigar, a station for trimming and knurling said cigar, and means adapted to receive said cigar after rolling and to transfer it to said trimming and knurling station, said means turning said cigar so as to reverse its endwise orientation during the transfer, said last means comprising a pair of pivoted levers and a cigar supporting device pivotally attached at spaced points to the free ends of said levers, and mechanism to rotate one of said levers about its pivoted point to transfer said cigar and reverse its endwise orientation.

12. In a Toscani cigar machine, a measuring chamber, means adapted to provide a stack of filler tobacco in said measuring chamber, a metering knife arranged to traverse said measuring chamber with a slicing component of motion, a ledger plate forming one wall of said measuring chamber, said ledger plate being arranged to co-operate with said metering knife in cutting off a measured filler charge from said stack, means adapted to withdraw said ledger plate in a direction transverse to the motion of said knife, a pivotally mounted transfer arm, a transfer receptacle slidably carried on said arm, a forming table, a forming apron on said table, a pocket in said apron, means adapted to swing said arm and thereby alternately to place said receptacle adjacent said measuring chamber and in line with said apron pocket, means activated to slide said receptacle along said arm, means for adjusting the amount of said sliding, whereby said filler charge in said receptacle is centered with respect to said apron, a trap door on said receptacle, a pusher adapted to traverse said receptable, means associated with said pusher and said receptacle adapted positively to open and close said trap door, means adapted to impel said pusher whereby said filler charge is expelled from said receptacle and is placed in said apron pocket, a forming roller adapted to traverse said forming table, means adapted to place a wrapper on said apron, and means adapted to propel said roller across said table whereby said filler charge is rolled in said wrapper to form a cigar.

13. A transfer mechanism adapted to transfer a bunch charge deposited in it into the pocket of the rolling apron of a cigar machine, said bunch transfer comprising a charge supporting chamber, a pivot, an arm swingably mounted about said pivot, said charge supporting chamber being slidably mounted for radial movement along said arm, means to yieldingly urge said chamber radially along said arm, an arcuate cam positioned adjacent the axis of said arm, a cam follower secured to said chamber to follow said arcuate cam, said arcuate cam being shaped to guide said chamber radially along said arm during movement of said arm about said axis, and an adjustable stop positioned to engage said chamber to arrest said radial movement of said chamber in one direction, said chamber being urged in said direction by said yieldable means and said cam follower leaving said cam when said chamber is arrested by said movable stop during movement of said arm about said axis, so that said transfer may transfer a bunch charge from one position to a second position when said first and second positions are at a different radii from said pivot.

14. A device substantially as set forth in claim 13 further characterized by a plunger slidably mounted on said transfer to engage said chamber to eject a bunch charge held therein.

15. In a Toscani cigar machine, a measuring chamber adapted to supply a tapered filler charge, a pivotally mounted arm, a receptacle slidably mounted on said arm, means adapted to transfer said tapered charge to said receptacle, a forming table, a forming apron on said table, means adapted to supply a wrapper to said apron, a forming roller adapted to traverse said table to operatively form a rolling pocket in said apron, an apron header, said apron being secured to said table at one end and to said header at the other end, means adapted to displace said header transversely of the traverse of said roller, means adapted to displace said header longitudinally of the traverse of said roller, means adapted to displace said header rotationally, means adapted to swing said arm to a position aligned with said pocket, means adapted to move said receptacle along said arm, means adapted to limit adjustably the limit of movement of said receptacle along said arm to align said receptacle relative to the center line of said apron and the center of said pocket, whereby a tapered charge may be deposited with its largest diameter on the center line of said apron and said header may be moved to alternately tension one half of said apron and then the other half of said apron.

16. In a cigar machine having a rolling table, a rolling apron on said table, an apron header, one end of said apron being secured to said table and the other end of said apron to said apron header, said apron header being operatively movable both transversely and longitudinally of said apron within substantially the same plane occupied by said apron, a transfer receptacle mounted for movement from a source of supply of filler charges to a position above and transverse said apron, mechanism for moving said transfer receptacle from said source of supply to said position, said mechanism including means for selectively moving said transfer receptacle longitudinally of itself and across to a selected predetermined position whereby said transfer receptacle is selectively located in a predetermined position across said apron.

References Cited in the file of this patent

UNITED STATES PATENTS

| | | |
|---|---|---|
| Re. 20,441 | Clausen | July 13, 1937 |
| 337,790 | Pumphrey | Mar. 9, 1886 |
| 405,438 | Smith | June 18, 1889 |
| 647,948 | Du Brul | Apr. 24, 1900 |
| 660,297 | Hankey | Oct. 23, 1900 |
| 699,607 | Wynget | May 6, 1902 |
| 770,240 | Moesinger | Sept. 13, 1904 |
| 1,075,189 | Burchardi et al. | Oct. 7, 1913 |
| 1,188,549 | Marsh | June 27, 1916 |
| 1,191,592 | Hansen | July 18, 1916 |
| 1,247,736 | Stockard | Nov. 27, 1917 |
| 1,281,344 | Gindrat | Oct. 15, 1918 |
| 1,470,492 | Shirk | Oct. 9, 1923 |
| 1,523,799 | Bronander | Jan. 20, 1925 |
| 1,586,330 | Rundell | May 25, 1926 |
| 1,599,962 | Halstead | Sept. 14, 1926 |
| 1,799,128 | Schussler | Mar. 31, 1931 |
| 1,926,227 | Carlson | Sept. 12, 1933 |
| 1,997,928 | Granstedt | Apr. 16, 1935 |
| 2,081,983 | Carlson | June 1, 1937 |
| 2,156,284 | Halstead | May 2, 1939 |
| 2,255,051 | Ferenci | Sept. 9, 1941 |
| 2,292,317 | Clausen | Aug. 4, 1942 |
| 2,310,489 | Halstead | Feb. 9, 1943 |
| 2,311,011 | Wheeler | Feb. 16, 1943 |
| 2,316,828 | Wheeler | Apr. 20, 1943 |
| 2,329,183 | Burns | Sept. 14, 1943 |
| 2,337,544 | Clausen | Dec. 28, 1943 |
| 2,353,424 | Wheeler | July 11, 1944 |
| 2,391,294 | Clausen | Dec. 18, 1945 |
| 2,470,766 | Durning | May 24, 1949 |

FOREIGN PATENTS

| | | |
|---|---|---|
| 620,056 | Germany | Oct. 12, 1935 |